(12) United States Patent
Takei et al.

(10) Patent No.: US 8,820,743 B2
(45) Date of Patent: Sep. 2, 2014

(54) PRINTING DEVICE

(75) Inventors: Akira Takei, Yamanashi-ken (JP);
Hiromitsu Tamura, Yamanashi-ken (JP); Tsuyoshi Kubota, Yamanashi-ken (JP); Daisuke Kaneoya, Yamanashi-ken (JP)

(73) Assignees: Toppan Printing Co., Ltd., Tokyo (JP); Nisca Corporation, Minamikoma-gun, Yamanashi (JP)

( * ) Notice: Subject to any disclaimer, the term of this patent is extended or adjusted under 35 U.S.C. 154(b) by 0 days.

(21) Appl. No.: 13/519,267

(22) PCT Filed: Dec. 27, 2010

(86) PCT No.: PCT/JP2010/073526
§ 371 (c)(1),
(2), (4) Date: Jun. 26, 2012

(87) PCT Pub. No.: WO2011/081128
PCT Pub. Date: Jul. 7, 2011

(65) Prior Publication Data
US 2012/0286464 A1    Nov. 15, 2012

(30) Foreign Application Priority Data

Dec. 28, 2009  (JP) ................. 2009-297109
Jul. 21, 2010  (JP) ................. 2010-164310
Jul. 21, 2010  (JP) ................. 2010-164311
Aug. 26, 2010  (JP) ................. 2010-189353

(51) Int. Cl.
*B65H 39/10*    (2006.01)

(52) U.S. Cl.
USPC ................. 271/302; 271/300; 271/296

(58) Field of Classification Search
USPC ......... 271/295, 296, 298, 300, 302, 185, 187, 271/176, 178, 179
See application file for complete search history.

(56) References Cited

U.S. PATENT DOCUMENTS

| | | | | |
|---|---|---|---|---|
| 5,768,143 A | * | 6/1998 | Fujimoto | 700/235 |
| 5,941,522 A | * | 8/1999 | Hagstrom et al. | 271/225 |
| 5,959,278 A | * | 9/1999 | Kobayashi et al. | 235/449 |
| 6,236,420 B1 | * | 5/2001 | Matsuzaka | 347/170 |
| 6,264,296 B1 | * | 7/2001 | Klinefelter et al. | 347/4 |
| 6,567,112 B2 | * | 5/2003 | Suzuki | 347/217 |
| 6,679,637 B2 | * | 1/2004 | Tsuruta et al. | 400/120.01 |
| 6,722,649 B2 | * | 4/2004 | Yui | 271/184 |

(Continued)

FOREIGN PATENT DOCUMENTS

| | | |
|---|---|---|
| JP | H04-125254 U | 11/1992 |
| JP | H07-137847 A | 5/1995 |
| JP | 2001-063893 A | 3/2001 |
| JP | 2001-353892 A | 12/2001 |

(Continued)

*Primary Examiner* — Ernesto Suarez
(74) *Attorney, Agent, or Firm* — Manabu Kanesaka

(57) ABSTRACT

A printing device is provided with a housing, and a card stacker is disposed above the housing. The card stacker stores cards to be placed parallel in a laminate manner. The housing houses a card rotating section, linear card transport path each being disposed below the card stacker, printing section provided below the card transport path, various sensors, and control section. A card storage section is disposed on the most downstream side of the card transport path. The card storage section stores processed cards to overlap in a laminate manner. The card stacker enables the supply number of cards to be increased, and it is possible to increase the height of the card storage section by the card transport path positioning in the upper portion inside the housing.

19 Claims, 15 Drawing Sheets

(56) References Cited

U.S. PATENT DOCUMENTS

| | | | |
|---|---|---|---|
| 6,762,780 B2 * | 7/2004 | Tsuruta et al. | 347/171 |
| 6,873,348 B1 * | 3/2005 | Isono et al. | 347/213 |
| 7,328,897 B2 * | 2/2008 | Bryant et al. | 271/225 |
| 7,878,505 B2 * | 2/2011 | Meier et al. | 271/302 |
| 8,646,770 B2 * | 2/2014 | Meier et al. | 271/81 |
| 2008/0216688 A1 | 9/2008 | Hoffman et al. | |
| 2009/0115831 A1 * | 5/2009 | Mochizuki | 347/214 |

FOREIGN PATENT DOCUMENTS

| | | |
|---|---|---|
| JP | 2002-103714 A | 4/2002 |
| JP | 2002-356027 A | 12/2002 |
| JP | 2002-362755 A | 12/2002 |
| JP | 2005-075603 A | 3/2005 |
| JP | 2005-186495 A | 7/2005 |
| JP | 2006-163767 A | 6/2006 |
| JP | 2009-282674 A | 12/2009 |

* cited by examiner

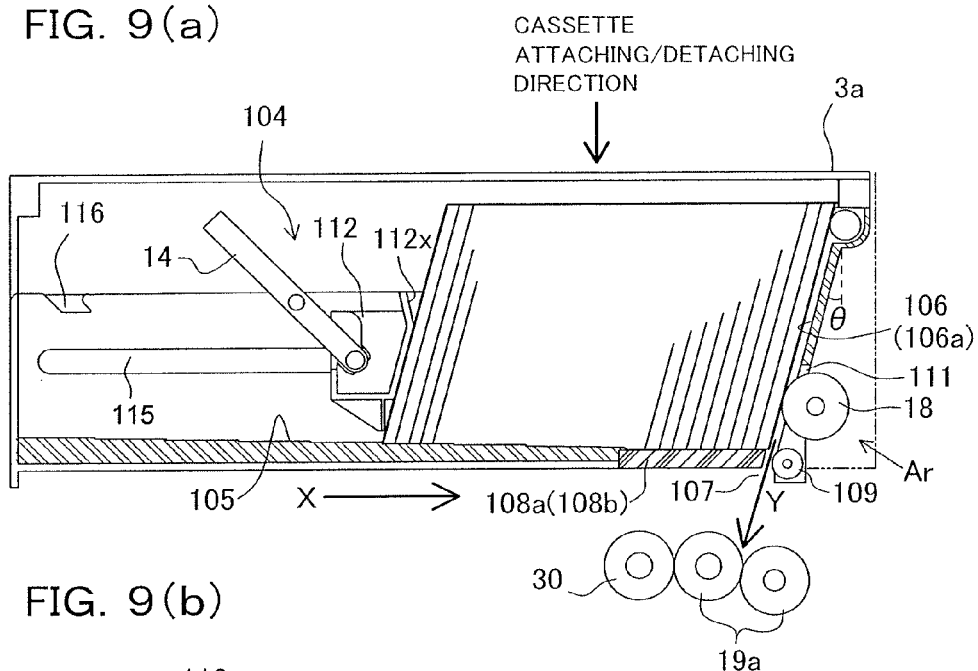
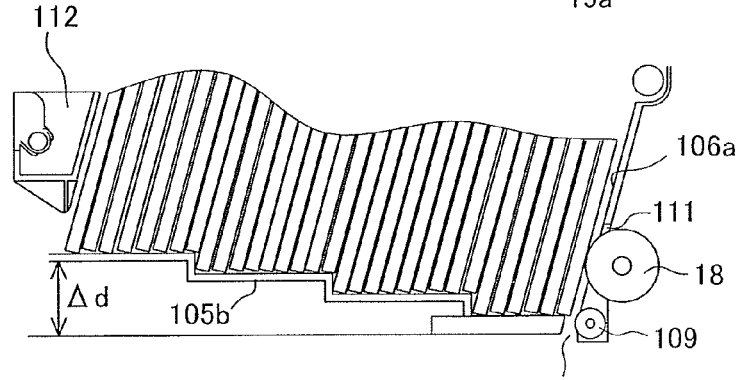
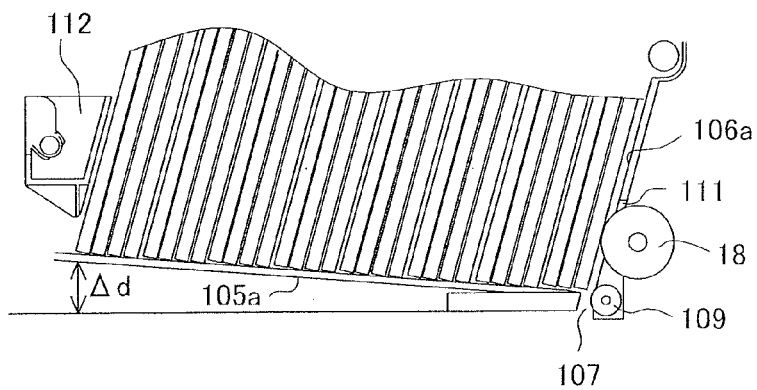

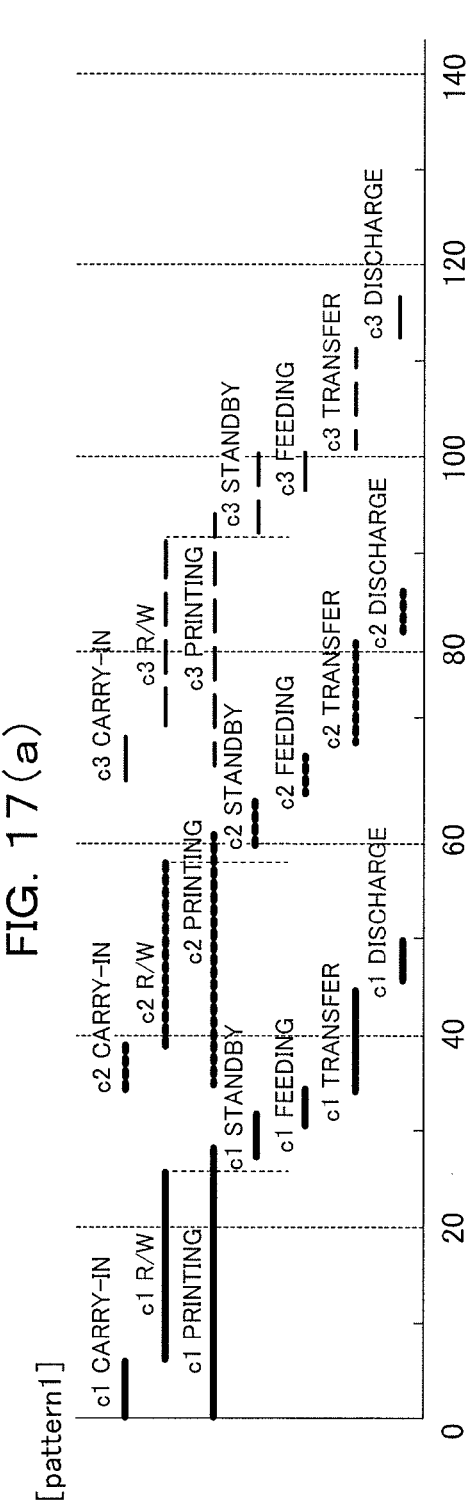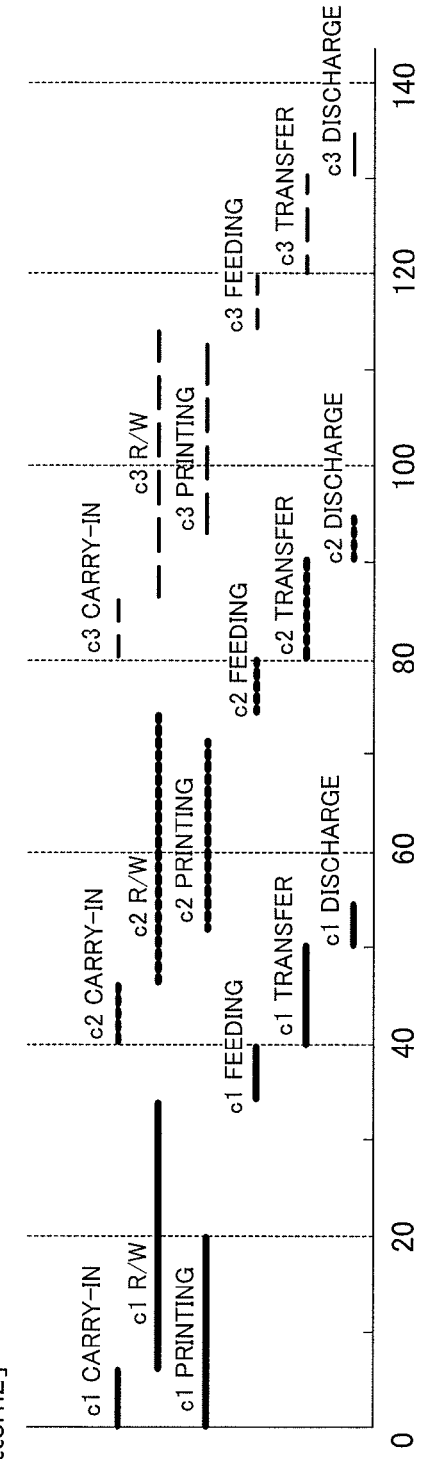

PRINTING DEVICE

RELATED APPLICATIONS

The present application is National Phase of International Application No. PCT/JP2010/073526 filed Dec. 27, 2010, and claims priority from Japanese Applications No. 2009-297109 filed Dec. 28, 2009; No. 2010-164311 filed Jul. 21, 2010; No. 2010-164310 filed Jul. 21, 2010; and No. 2010-189353 filed Aug. 26, 2010.

TECHNICAL FIELD

The present invention relates to a printing device, and more particularly, to a printing device capable of printing on card-shaped printing media.

BACKGROUND ART

Conventionally, in preparing card-shaped printing media such as credit cards, cash cards, license cards and ID cards, used are printing devices for bringing a thermal head and a platen roller into press-contact via an ink ribbon to form an image on a film-shaped intermediate transfer medium, and transferring the formed image to a printing medium.

Such a printing device is usually provided with a supply section to supply card-shaped printing media, a printing section that having an image formation section and an image transfer section, and a storage section that stores printing-processed printing media. A printing medium supplied from the supply section is transported to the printing section, and the printing section transfers an image formed in the image formation section to the printing medium in the image transfer section. Further, in recording magnetic information or the like on a printing medium, or in storing electronic information in an IC incorporated into a printing medium, a magnetic write section or an IC write section is provided on the upstream side or downstream side of the printing section, and various kinds of information are recorded on printing media. The printing media subjected to the printing processing by transfer of the image and the recording processing by write of the information are stored in the storage section provided on the most downstream side.

In addition, in the case of performing the printing processing and recording processing on a large amount of printing media, it is necessary to increase the capacity of the supply section, the transport path is also increased, and there is a tendency that the entire printing device is upsized. To avoid the upsizing, such a technique is disclosed that the printing section is disposed above the supply section, a change section for changing the transport direction of printing media is disposed on the downstream side of the supply section while being on the upstream side of the printing section, and that the transport path of the printing media is below the printing section while being above the supply section (for example, see Patent Document 1). In this technique, since the supply section is disposed below the printing section, it is possible to miniaturize the printing device, and to increase the supply number of printing media corresponding to the length of the transport path.

PRIOR ART DOCUMENT

Patent Document

Patent Document 1: Japanese Patent Gazette No. 3625206

DISCLOSURE OF INVENTION

Problems to be Solved by the Invention

However, in the technique of Patent Document 1, since the transport path of printing media is below the printing section while being above the supply section, the transport path is positioned in the lower portion inside the printing device. In other words, since the printing media are in the shape of a card, the height of the supply section is decreased, and the height position of the transport path is lowered. The printing medium subjected to the printing processing is discharged in the height position of the transport path, and it is thereby difficult to make the storage section higher than the height position of the transport path. As a result, since the capacity of the storage section is decreased, even when the supply number of media is increased in the supply section, it is not possible to store all the printing media subjected to the printing processing or the like in the storage section. When the size of the storage section is increased in the lateral direction, it is possible to store all the supplied printing media, but the whole of the printing device including the storage section is upsized. Further, when the size of the storage section is increased in the lateral direction, it becomes difficult to store the printing media in an alignment state, and such a problem arises that the printing media are scattered inside the storage section.

In view of the aforementioned matters, it is an object of the present invention to provide a printing device capable of supporting large-amount discharge in response to large-amount supply of printing media while miniaturizing the device.

Means for Solving the Problem

To attain the object, in the invention, a printing device capable of printing on a card-shaped printing medium is a printing device provided with a linear transport path to transport the printing medium, a card rotating section provided at one end of the transport path to change the transport direction of the printing medium, a supply stacker provided above the transport path and the card rotating section to store printing media prior to processing to be placed parallel in a laminate manner, a printing section provided below the transport path to perform printing processing on the printing medium from below the transport path, and a discharge stacker provided at the other end of the transport path to store printing media subjected to the printing processing to overlap in a laminate manner.

In the invention, the device has an openable/closable top cover to cover the transport path as a part of the device housing, the supply stacker is configured to be detachable and attachable with respect to the top cover, and the top cover may be configured to be openable and closable with the supply stacker not attached to the top cover.

Further, the printing section has an image formation section that forms an image on an intermediate transfer medium, and an image transfer section provided above the image formation section to transfer the image formed on the intermediate transform medium to the printing medium, and a first recording section that records information on the printing medium may further be provided in between the image transfer section and the card rotating section while being between the transport path and the supply stacker.

At this point, the first recording section is capable of performing recording processing on the printing medium, with the printing medium held at its one end by the card rotating section.

Furthermore, a second recording section that records information on the printing medium may be further provided on the side opposite to the supply stacker in the card rotating section on an extension of a supply path to supply the printing medium toward the card rotating section from the supply stacker.

The device is further provided with an error discharge outlet to discharge the printing medium when the recording processing fails in the first or second recoding section, the error discharge outlet is provided on the side opposite to the first recording section in the card rotating section, the first recording section, the card rotating section and the error discharge outlet are disposed linearly, and it is possible to discharge the printing medium failing in the recording processing toward the error discharge outlet from the card rotating section.

Moreover, the device is provided with a third recording section that records information on the printing medium on an extension of the transport path of the card rotating section, and the third recording section is capable of performing recording processing on the printing medium with the printing medium held at its one end by the card rotating section.

The printing section may be provided in between the discharge stacker and the second recording section.

Further, in the aforementioned device, on the sending side of the supply stacker are provided a supply roller that sends out the printing medium, and separating means for separating the sent printing medium on a sheet-by-sheet basis, the supply stacker is comprised of a stacker housing, a printing media storage section that aligns and stores a plurality of printing media in a standing posture forward and backward in the sending direction, a medium feed opening to feed a front printing medium stored in the printing media storage section toward the printing section, a support member that supports the back of a backmost printing medium stored in the printing media storage section, and biasing means for biasing the support member in the sending direction of the printing medium, each provided inside the stacker housing, the printing media storage section is provided with a printing media placement surface to place the printing media in the standing posture, and a printing media lock surface that engages in the front printing medium, and the printing media lock surface has an inclined surface that locks the printing media in a forward-tilting posture.

Furthermore, the housing of the supply stacker is provided with a sending-out opening that engages the supply roller in the surface of the front printing medium in the printing media storage section, and the printing media lock surface, the sending-out opening and the medium feed opening are disposed in this order in the printing media feeding direction. The device housing is provided with a stacker insertion opening to insert the supply stacker, and the stacker insertion opening is configured to enable the supply stacker to be inserted and removed in the approximately same direction as the printing medium carrying-out direction. Then, the printing media placement surface has a height difference that inclines the printing medium forward in the sending direction, and the height difference may be comprised of a plurality of step surfaces that are lowered stepwise in the sending direction, or an inclined surface that is lowered gradually in the sending direction. Meanwhile, the separating means is comprised of a separation gap provided in the supply stacker to separate printing media.

Moreover, in the invention, a printing device that transfers an image on an intermediate transfer medium formed in an image formation section to a card-shaped printing medium in an image transfer section is provided with a supply stacker that supplies a printing medium, a card rotating section that changes a transport direction of the printing medium fed from the supply stacker, a first transport path that carries the printing medium in a first direction from the card rotating section, a second transport path that carries the printing medium in a second direction from the card rotating section, the image transfer section disposed in the first transport path to transfer an image to the printing medium, and an information recording section disposed in the second transport path to record information on the printing medium, the supply stacker is disposed above the first transport path parallel along the first transport path, the first transport path and the second transport path carry the printing medium in mutually different angular directions, the first transport path is provided with a standby section between the card rotating section and the image transfer section to cause the printing medium to temporarily wait, and the image formation section and the image transfer section are disposed in the printing medium carrying direction of the first transport path that carries the printing medium toward the image transfer section from the card rotating section, in order of the image formation section and the image transfer section.

The supply stacker and the card rotating section are disposed in the device housing from above to below in order of the supply stacker and the card rotating section, the first transport path is disposed in the approximately horizontal direction from the card rotating section, the second transport path is disposed in the approximately vertical direction from the card rotating section, and the image formation section and the image transfer section are disposed in the horizontal direction below the first transport path in order of the image formation section and the image transfer section.

Further, the card rotating section is provided with a rotating frame axially supported by the device housing to be rotatable, at least a pair of rollers that hold the printing medium placed in the rotating frame, driving means for rotating the rotating frame, and roller driving means for rotating the pair of rollers, and the roller driving means rotates the pair of rollers forward and backward to carry the printing medium in and out of the printing medium.

Alternatively, the supply stacker is comprised of a card storage section capable of aligning and storing printing media in a standing posture forward and backward, and a supply opening disposed in the card storage section to feed the printing medium, and the direction for sending out the printing medium to the supply opening is set at the direction opposite to the direction for carrying the printing medium to the image transfer section from the card rotating section in the first transport path. In the first transport path is disposed a transport roller that carries the printing medium fed from the card rotating section to the image transfer section, and the transport roller is disposed in the standby section and is configured to hold the printing medium while being halted. In addition, the intermediate transfer medium for transferring the image to the printing medium is disposed to be able to run in the image transfer section, and is formed of a transfer film, in the image formation section that forms the image on the transfer film are disposed an image formation platen, ink ribbon, and thermal head, and the image formation section is disposed in a position opposed to the standby section, on the upstream side of the image transfer section in the direction for carrying the printing medium that moves along the first transport path.

Then, the transfer film is comprised of a transfer film cassette inserted detachably in the device housing, a supply spool and a winding spool disposed in the transfer film cassette, and the transfer film wound between the supply spool and the winding spool, the ink ribbon is comprised of a ribbon cassette inserted detachably in the device housing, a supply spool and a winding spool disposed in the ribbon cassette, and the ink ribbon wound between the supply spool and the winding spool, and with respect to the transfer film cassette and the ribbon cassette, the ribbon cassette is disposed on the upstream side along the first transport path for carrying the printing medium from the card rotating section to the image transfer section, while the transfer film cassette is disposed on the downstream side.

Further, the first transport path is provided with a transport roller that carries the printing medium, driving means for driving the transport roller, and control means for controlling the driving means, and the control means is provided with comparing means for comparing an operation of finish time of image recording in the second transport path, an operation of finish time of image information in the image formation section, the finish time of image formation and the finish time of information recording, and when the finish time of image formation is later than the finish time of information recording in the comparing means, causes the printing medium fed from the card rotating section to wait in the standby section, while when the finish time of information recording is later than the finish time of image formation in the comparing means, carrying the printing medium fed from the card rotating section to the image transfer section without causing the printing medium to wait in the standby section.

Advantageous Effect of the Invention

According to the invention, printing media are stored in the supply stacker provided above the transport path of printing media, in a laminate manner to be placed parallel, and it is thereby possible to increase the supply number of printing media. Meanwhile, by placing the transport path above the printing section, it is possible to miniaturize the entire device, while since the transport path is located in the upper portion inside the printing device, it is possible to increase the height of the discharge stacker. Therefore, it is possible to obtain the effect of enabling all the printing media supplied from the supply stacker to be stored in the discharge stacker and of supporting large-amount discharge in response to large-amount supply.

Further, according to the invention, the card storage section is configured to align and store a plurality of cards in a standing posture forward and backward in the sending direction, it is configured that the front card is supplied to the inside of the information recording device from the medium feed opening, and it is thereby possible to store a large amount of cards, as compared with the conventional case of stacking and storing cards vertically in a horizontal posture and recording in a recording section disposed in the horizontal direction.

Concurrently therewith, since the card lock surface (printing media lock surface) that engages in the front card is provided with an inclined surface for locking the cards in a forward-tilting posture, the cards stored in the card storage section are supported in the storage section in the forward-tilting posture. Therefore, in work of adding cards or work of removing the front card that is jammed, there is little fear that stored cards fall and are scattered, and the work is ease.

Further, according to the invention, in the first transport path for forming an image on a recording medium, the standby section is provided in between the card rotating section that reverses the direction of the recording medium and the image transfer section that prints and transfers the image to the transfer film, the image formation section for forming an image on the transfer film is disposed parallel in space occupied by the standby section, and it is thereby possible to make the device small in size and compact.

Furthermore, since the standby section is disposed in between the card rotating section and the image transfer section in the first transport path, it is possible to record information on a succeeding recording medium in the second transport path located on the upstream side of the first transport path after sending a preceding recording medium to the standby section.

Concurrently therewith, for the recording processing in the second transport path and the image formation processing in the first transport path, it is possible to set the path (place) and timing for the processing of the job individually. Accordingly, for example, when a malfunction (jam or the like) occurs in the ink ribbon and/or transfer film, it is possible to halt the device after recording the information on the succeeding recording medium in the second transport path with the preceding recording medium waiting in the standby position, and it is not necessary to remove all recording media inside the device to handle the error. Further, after handling the malfunction (after handling the jam), since the recording medium waits in the predetermined standby position, it is easy to resume the device after handling.

In addition, in the invention, the standby section is not disposed in the image transfer section, and is disposed in between the card rotating section and the image transfer section. If a recording medium waits in the image transfer section, the front end portion of the recording medium is heated by a heat source of the image transfer section. When only the front end portion of the recording medium is heated, a temperature difference occurs in a single recording medium, and there is a fear that fluctuations arise in the image.

Therefore, in the invention, since the standby section is provided in between the card rotating section and the image transfer section, it does not happen that apart of the waiting recording medium is heated. Further, when the standby section is provided in the card rotating section or the information recording section, it is not possible to perform parallel processing of the image formation processing on the preceding recording medium and the information recording processing on the succeeding recording medium, and it is thus preferable to provide the standby section in between the card rotating section and the image transfer section in the first transport path.

BRIEF DESCRIPTION OF DRAWING

FIG. 3 contains explanatory views of an ink ribbon and intermediate transfer film, where

FIG. 9 contains explanatory views of the card stacker of FIG. 8, where FIG. 9(a) shows a vertical sectional view, FIG. 9(b) is an enlarged view of a card placement surface, and FIG. 9(c) shows the case where the card placement surface is comprised of an inclined surface;

FIGS. 17(a) and 17(b) are timing charts for performing simultaneous parallel processing on a plurality of cards.

MODE FOR CARRYING OUT THE INVENTION

Embodiment 1

Embodiment 1 will be described below, in which the present invention is applied to a printing device for transferring an image to a card-shaped recording medium (hereafter, referred to as a card C) to print, based on drawings of FIGS. 1 to 6.

(Configuration)

Figure 1:
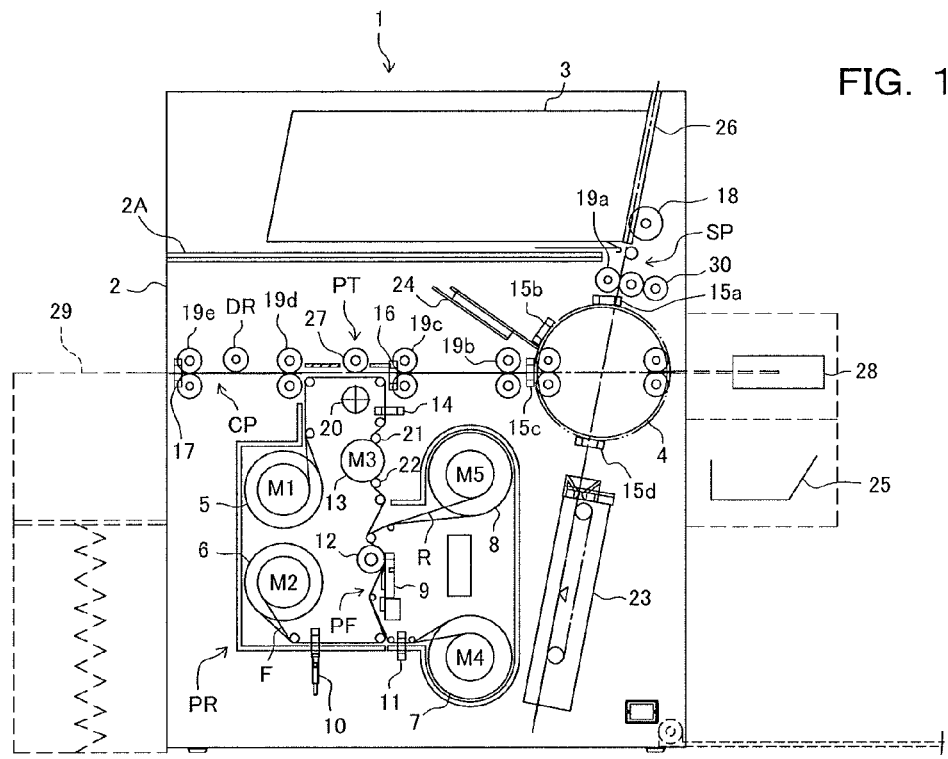
FIG. 1 is a front view showing a configuration of a printing device of Embodiment 1 to which the invention is applicable.
Figure 4:
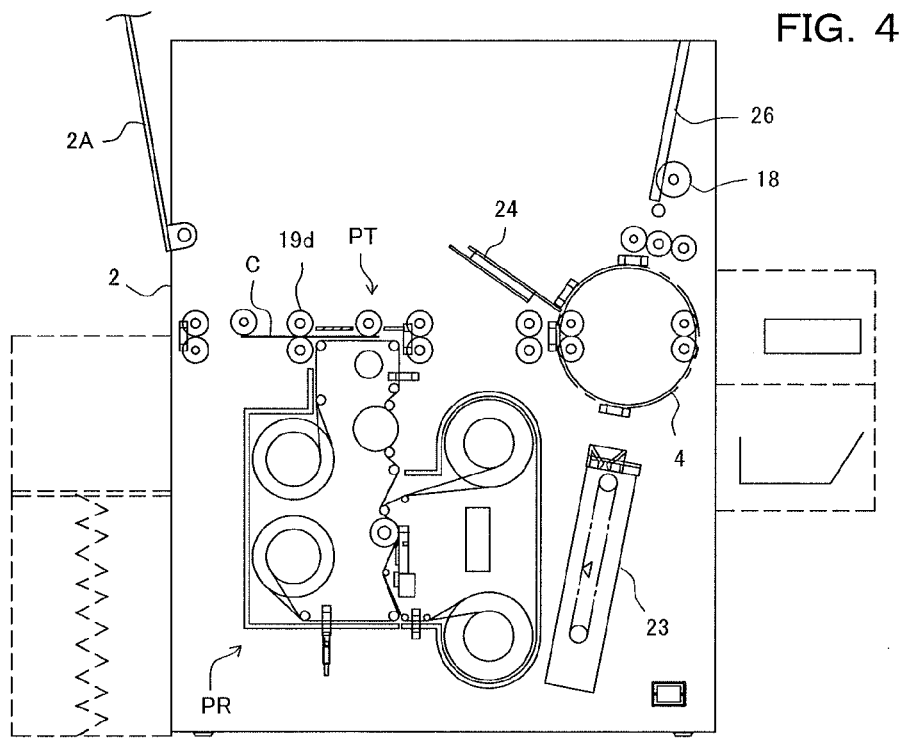
FIG. 4 is a front view schematically showing a state in which a cover is opened in the printing device of Embodiment 1.

As shown in FIG. 1, a printing device 1 of the invention is provided with a housing 2 as a device housing. An opening is formed at the top of the housing 2, and a cover body 2A as a top cover is disposed to cover the opening. One end portion of the cover body 2A is axially supported by an edge portion on one side in the upper portion of the housing 2 to be openable and closable. In other words, as shown in FIG. 4, it is possible to open and close the cover body 2A by rotating the other end portion about one end portion. As shown in FIG. 1, above the cover body 2A is provided a card stacker 3, as a supply stacker that is a supply source of cards C, to be detachable and attachable with respect to the cover body 2A. The cover body 2A is openable and closable when the card stacker 3 is not attached to the cover body 2A (also see FIG. 4).

Inside the housing 2 are mainly stored a card rotating section (change section) 4 disposed below the card stacker 3 to rotate a card C supplied from the card stacker 3 a predetermined angle while nipping the card, an approximately horizontal linear card transport path CP to transport the card C from the card rotating section 4, a printing section PR provided below the card transport path CP in the substantially center portion of the card transport path CP to perform printing processing on the card C, and a control section that controls various sensors to acquire position information and the whole of the printing device 1. Further, outside the housing 2, on the side opposite to the card rotating section 4 in the card transport path CP is disposed a card storage section 29 as a discharge stacker to store printed cards C. Since the printing section PR is provided below the card transport path CP, the card transport path CP is positioned in the vicinity immediately below the cover body 2A. In other words, the cover body 2A is arranged in the position for covering the card transport path CP and a part of the card rotating section 4, and the card stacker 3 is provided above the card transport path CP and the card rotating section 4.

The card stacker 3 stores a plurality of blank cards C to be placed parallel in a laminate manner. In other words, the cards C are stored inside the card stacker 3 so that the thickness direction is aligned along the approximately horizontal direction. In a position near the other end portion of the cover body 2A in the card stacker 3 is disposed a stacker side plate 26 having a medium feed opening 107 (FIG. 9) to permit the passage of only a single card C. Under the stacker side plate 26 on the side opposite to the card stacker 3 is disposed a card supply roller 18 in press-contact. The card supply roller 18 rotates and thereby sends out the card C positioned on the outermost side on a card-by-card basis among a plurality of blank cards C stored in the card stacker 3. The card support roller 18 comes into contact with the card C through a sending-out opening provided in the stacker side plate 26.

Under the card supply roller 18 is formed a supply path SP to supply the card C toward the card rotating section 4. In the supply path SP is disposed a first card transport roller pair comprised of a transport roller 19a disposed on one side (left side in FIG. 1) of the supplied card C, and a driven roller disposed on the other side (right side in FIG. 1). The first card transport roller pair is comprised of cleaning rollers having adhesion on their surface to clean the surface of the card C. Further, on the side opposite to the transport roller 19a in the driven roller in the first card transport roller pair, a cleaner roller 30 is disposed in press-contact. In the cleaner roller 30, the surface is coated with a substance having stronger adhesion than the first card transport roller pair to clean the surface of the driven roller (eventually, the transported card C). A card locating section 15a is disposed in the vicinity of the card rotating section 4 on the downstream side of the first card transport roller pair in the supply path SP. For example, the sensor is capable of being formed of a transmission integral type or reflective integral type, and is to detect a card end of the card C transported on the supply path SP.

The card rotating section 4 is disposed below the first card transport roller pair, and inside a rotating frame axially supported by the device housing 2 to be turntable and rotatable are disposed two roller pairs that nip the opposite ends of the card C, and a card guide (not shown) to guide the card C in between two roller pairs. By this means, by the rotating frame rotating, the card rotating section 4 is capable of reversing or changing the transport direction of the card held between the pinch roller pairs. To prevent the roller pairs constituting the card rotating section 4 from rotating together with the card C and thereby displacing the card C, entire rotation of the card rotating section 4 and rotation of the roller pairs is driven independently. In addition, although abstracted in FIG. 1, one roller of the roller pair is a driving roller, and the other roller is a driven roller.

Around the card rotating section 4 are arranged a magnetic write section (second recording section) 23 that magnetically recording information on a magnetic stripe while reading the recorded magnetic information to verify (confirm recording) when the card C is a magnetic card, an IC write section (first recording section) 24 that stores electronic information in an incorporated non-contact type IC while reading the stored electronic information to verify when the card C is an IC card, and an eject box 25 (error discharge outlet) to store failed cards to abandon when the magnetic card or IC card is determined to be faulty by verification. Further, on the outward side on the card rotating section 4 side of the housing 2, a barcode write section (third recording section) 28 is disposed to add barcode information while reading the added barcode information to verify when the card C is provided with a barcode.

Figure 5:
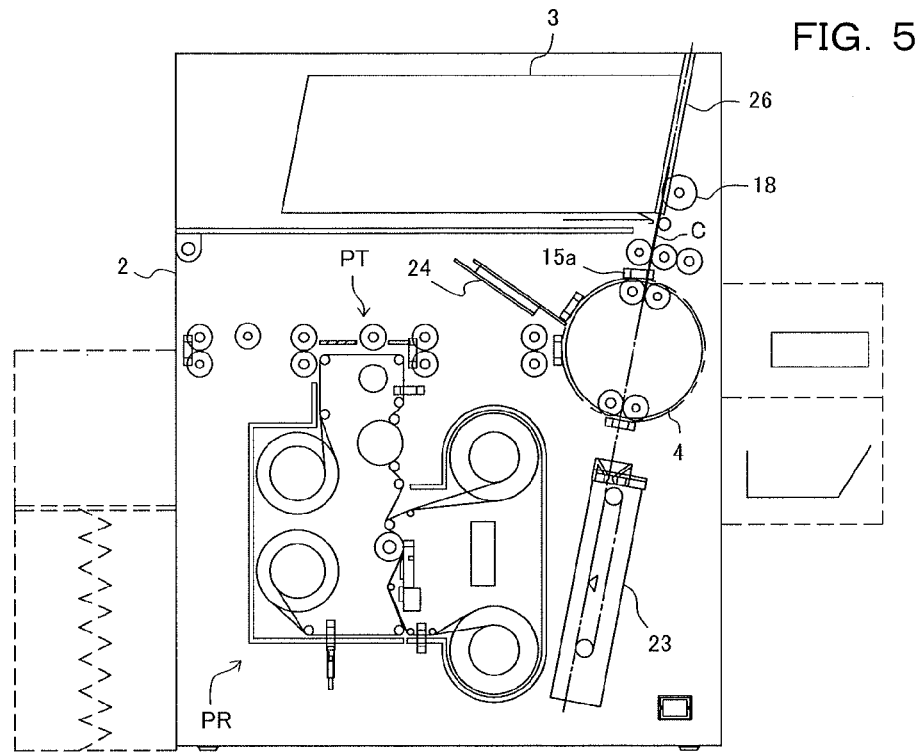
FIG. 5 is a front view schematically showing a state in which a card is supplied from a card stacker and transported on a supply path in the printing device of Embodiment 1.
Figure 6:
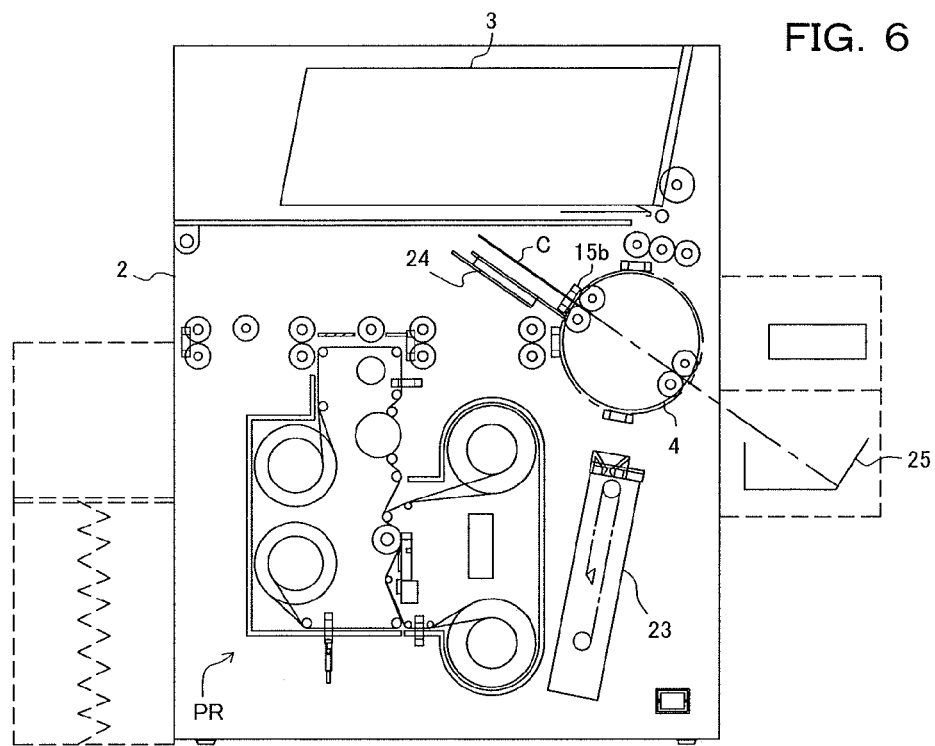
FIG. 6 is a front view schematically showing a state in which the card is held at its one end by a card rotating section when an IC write section performs recording processing on the card in the printing device of Embodiment 1.

A receiving opening of the magnetic write section 23 is disposed on the side opposite to the card stacker 3 in the card rotating section 4, on an extension of the supply path SP that supplies the card C toward the card rotating section 4 from the supply stacker 3. In other words, as shown in FIG. 5, the medium feed opening 107 of the stacker side plate 26, the card rotating section 4 and the magnetic write section 23 are disposed linearly. A card locating sensor 15*d* is disposed in the vicinity of the card rotating section 4 in the transport path toward the receiving opening of the magnetic write section 23. The IC write section 24 is disposed in between the card transport path CP and the card stacker 3 i.e. above the card transport path CP and below the card stacker 3. Further, since the printing section PR is positioned below the substantially center portion of the card transport path CP, the IC write section 24 is disposed in between the printing section PR (more specifically, image transfer section, described later specifically) and the card rotating section 4. A card locating sensor 15*b* is disposed in the vicinity of the card rotating section 4 in the transport path toward the IC write section 24. As shown in FIG. 6, the eject box 25 is disposed on the side opposite to the IC write section 24 in the card rotating section 4, and the IC write section 24, the card rotating section 4 and the eject box 25 are disposed linearly. Further, the barcode write section 28 is disposed on an extension of the card transport path CP of the card rotating section 4. In addition, each of the card locating sensors 15*b*, 15*d* is capable of being formed of a transmission integral type or reflective integral type as in the above-mentioned card locating sensor 15*a*.

As shown in FIG. 1, by the rotating frame rotating a predetermined angle, the card rotating section 4 changes or reverses the transport direction of the card C nipped by two pinch roller pairs. In other words, the card C is positioned toward the magnetic write section 23, IC write section 24, barcode write section 28, receiving opening of the eject box 25 and card transport path CP by the card rotating section 4. The magnetic write section 23, IC write section 24 and barcode write section 28 perform recording processing of respective information on the card C with the card held at its one end portion by the card rotating section 4 (one pinch roller pair). In addition, although abstracted in FIG. 1, in the card rotating section 4, three rotation position sensors are provided on the supply path SP side, the IC write section 24 side and the card transport path CP side, respectively. Among the sensors, the position sensors on the IC write section 24 side and the card transport path CP side are capable of detecting the rotation position of the card C, and the position sensor on the supply path SP side is capable of detecting the rotation position of the card C or the rotation position of the driving roller in one pinch roller pair of two pinch roller pairs. Further, below the IC write section 24, a shield plate, not shown, is disposed along the IC write section 24 to avoid the effect on the printing section PR and the sensor in the card transport path CP by electromagnetic waves generated in the IC write section 24.

To transport the card C in the approximately horizontal direction from the card rotating section 4, the card transport path CP has a second card transport roller pair, disposed on the downstream side of the card rotating section 4, comprised of a transport roller 19*b* disposed above the card transport path CP and a driven roller disposed below the path CP. On the downstream side of the second card transport roller pair are disposed a third card transport roller pair comprised of a transport roller 19*c* and a driven roller, a platen roller 27 (constituting also the image transfer section, described later) on the downstream side of the third card transport roller pair, a fourth card transport roller pair, on the downstream side of the platen roller 27, comprised of a transport roller 19*d* and a driven roller, and a fifth card transport roller pair, on the downstream side of the fourth card transport roller pair, comprised of a transport roller 19*e* and a driven roller. Standby space corresponding to a single card C is formed in between the second card transport roller pair (transport roller 19*b*) and the platen roller 27 (image transfer section PT).

The card locating sensor 15*c* is arranged on the upstream side in the card transport direction of the second card transport roller pair i.e. in the vicinity of the card rotating section 4, a card locating section 16 is arranged in the downstream vicinity in the card transport direction of the third card transport roller pair, and a card locating sensor 17 is arranged in the downstream vicinity in the card transport direction of the fifth card transport roller pair in the most downstream position of the card transport path CP. For example, each of these sensors is capable of being formed of a transmission integral type or reflective integral type, and detects the card end of the card C transported on the card transport path CP.

<Printing Section>

The printing section PR is provided below the card transport path CP in the substantially center portion of the card transport path CP, and is provided in between the magnetic write section 23 disposed below the card rotating section 4 and the card storage section 29. The printing section PR is comprised of an image formation section PF having a thermal head 9 and platen roller 12 to form an image on an intermediate transfer film F, an intermediate transfer film transport section that transports the intermediate transfer film F, an ink ribbon transport section that transports an ink ribbon R, and the image transfer section PT that transfers the image formed on the intermediate transfer film F to the card C. The image transfer section PT is provided above the image formation section PF. In other words, the printing section PR is provided in between the magnetic write section 23 and the card storage section 29 below the card transport path CP, and therefore, the image transfer section PT provided above the image formation section PF is positioned in the substantially center portion of the card transport path CP.

In the image formation section PF, the platen roller 12 is axially supported to be rotatable in a fixed position. The thermal head 9 is configured to be able to travel between a separate position separate from the platen roller 12 and a printing position (state as shown in FIG. 1) in press-contact with the outer periphery of the platen roller 12 via the intermediate transfer film F and the ink ribbon R. In forming an image on the intermediate transfer film F, the intermediate transfer film F and the ink ribbon R exist between the platen roller 12 and the thermal head 9. According to a command (printing command of image information of an image, text and the like stored in a buffer memory) of the control section, in the printing position, the image formation section PF selectively heats heating elements constituting the thermal head 9 for the ink ribbon R, and thereby forms an image (mirror image) on the intermediate transfer film F.

The intermediate transfer film transport section has a film supply section 5 that supplies the intermediate transfer film F, a film winding section 6 that winds up the intermediate transfer film F, and a film main transport roller 13 that transports the intermediate transfer film F with high accuracy and is comprised thereof. As respective rotation driving sources, the spool shaft of the film supply section 5 has a DC motor M1 capable of rotating forward and backward at high speed, the spool shaft of the film winding section 6 has a DC motor M2 capable of rotating forward and backward at high speed, and the film main transport roller 13 has a stepping motor M3 capable of rotating forward and backward at high speed. In addition, the film winding section 6 is also used in managing back tension of the intermediate transfer film F in transferring the image formed on the intermediate transfer film F to the card C in the image transfer section PT. At this point, nip rollers 21, 22 (described specifically later) arranged in the film main transport roller 13 are separated from the film main transport roller 13.

Further, in the intermediate transfer film transport section, a plurality of rollers is arranged to change the transport direction in transporting the intermediate transfer film F between the film supply section 5 and the film winding section 6. In the film main transport roller 13 are arranged two nip rollers 21, 22 movable between a nip position to come into press-contact with the film main transport roller 13 via the intermediate transfer film F and a separate position separate from the film main transport roller 13. The nip roller 21 is positioned on the upper side (the card transport path CP side) of the film main transport roller 13, and the nip roller 22 is positioned on the lower side. As a driving source for moving such nip rollers 21, 22 between the nip position and the separate position, for example, it is possible to use a magnetic plunger.

In the vicinity of the film winding section 6, a first mark detection sensor 10 is disposed to detect a mark (hereinafter, this mark is referred to as a first mark) formed on the intermediate transfer film F. In between the first mark detection sensor 10 and the film main transport roller 13, the image formation section PF is disposed via a plurality of rollers. In other words, the thermal head 9 and the platen roller are disposed to be opposed. Further, two rollers are arranged above the film main transport roller 13 to line in the approximately horizontal direction below the card transport path CP. The intermediate transfer film F is transported substantially horizontally between these two rollers (this portion in which the intermediate transfer film F is substantially horizontally transformed is referred to as a horizontal transport portion for the sake of convenience.) One of these two rollers is positioned on the downstream side in the card transport direction in the vicinity of the third card transport roller pair having the transport roller 19c, and the other roller is positioned on the upstream side in the card transport direction in the vicinity of the fourth card transport roller pair having the transport roller 19d. In between the roller disposed in the vicinity of the third card transport roller pair and the nip roller 21 in the film main transport roller 13, a transfer locating sensor 14 is disposed to detect a mark of the intermediate transfer film F in transferring the image formed on the intermediate transfer film F to the card. In addition, as in various sensors as described above, the first mark detection sensor 10 and the transfer locating sensor 14 are also capable of being formed of a transmission integral type or a reflective integral type.

Figure 3A:
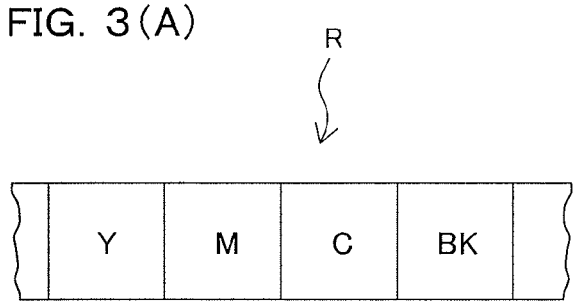
FIG. 3(A) is a front view schematically showing the ink ribbon.
Figure 3B:
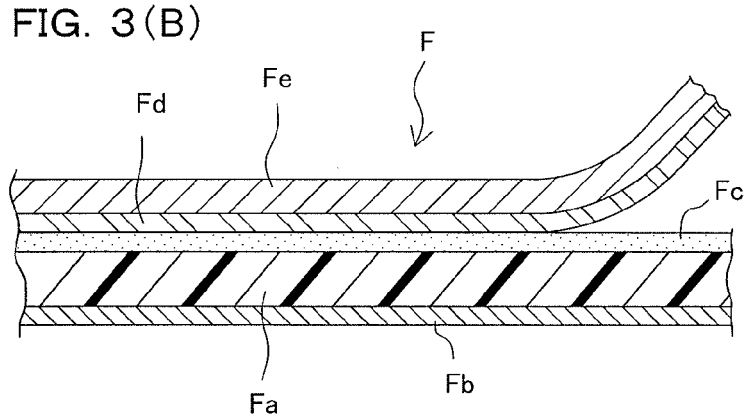
FIG. 3(B) is a sectional view schematically showing the intermediate transfer film.

As shown in FIG. 3(B), the intermediate transfer film F has a base film Fa, back coat layer Fb formed on the backside of the base film Fa, acceptance layer Fe for accepting ink, overcoat layer Fd for protecting the surface of the acceptance layer Fe, and release layer Fc formed on the frontside of the base film Fa to promote peeling, by heating, of the overcoat layer Fd and the acceptance layer Fe as one piece from the base film Fa. In the intermediate transfer film F, from the lower side, the back coat layer Fb, base film Fa, release layer Fc, overcoat layer Fd and acceptance layer Fe are laminated in this order. The intermediate transfer film F is transported so that the acceptance layer Fe side is opposed to the ink ribbon R, and that the back coat layer Fb side is able to come into contact with the platen roller 12. In addition, although abstracted in FIG. 3(B), the above-mentioned first mark is formed linearly in the direction crossing the longitudinal direction of the intermediate transfer film F at predetermined intervals of one image area corresponding to the card C.

As shown in FIG. 1, the ink ribbon transport section has a ribbon supply section 7 that supplies the ink ribbon R, and a ribbon winding section 8 that winds up the ink ribbon R. In the spool shafts of the ink ribbon supply section 7 and the ribbon winding section 8, DC motors M4, M5 capable of rotating forward and backward at high speed are used as a rotation driving source, respectively.

In between the ribbon supply section 7 and the thermal head 9 is disposed a second mark detection sensor 11 to detect a mark (hereinafter, this mark is referred to as a second mark, and in this example, BK of the ink ribbon R is used as the second mark) formed on the ink ribbon R. As in various sensors as described above, the second mark detection sensor 11 is also capable of being formed of a transmission integral type or a reflective integral type. The position of the ink ribbon R is managed by detecting the second mark with the second mark detection sensor 11. In addition, actually, the ink ribbon R is comprised of a plurality of colors as described below, and therefore, is transported in the substantially vertical direction to prevent the occurrence of misregistration (to improve printing quality) in image formation.

As shown in FIG. 3(A), for example, the ink ribbon R has the shape of a film in a band shape with the width slightly longer than the length in the longitudinal direction of the card C. Ink of Y (Yellow), M (Magenta), C (Cyan) and BK (Black) is coated on the film and is repeated in a panel sequence.

As shown in FIG. 1, the image transfer section PT is disposed in the substantially center portion in the above-mentioned horizontal transport portion of the intermediate transfer film F. In the image transfer section PT, the platen roller 27 is disposed above the card transport path CP to support the card C in transferring the image formed on the intermediate transfer film F to the card C, and a heat roller 20 is disposed below the card transport path CP to be able to move forward and backward between a proceeding position and a retracted position with respect to the platen roller 27. In other words, in the image transfer section PT, the image is transferred to the card C from below the card transport path CP. Into the heat roller 20 is incorporated a heating lamp, not shown, for heating the intermediate transfer film F. The platen roller 27 and heating roller 20 are disposed to nip the card C and the intermediate transfer film F transported in the card transport path CP. To move the heating roller 20 forward and backward, for example, it is possible to use a cam. Further, a decurl roller DR to correct curling of the image-formed card C is disposed in between the fourth card transport roller 19d and the fifth card transport roller 19e above the card transport path CP. The decurl roller DR is disposed to be able to move forward and backward between a proceeding position and a retracted position with respect to the card transport path CP, and corrects curling of the card C due to heat of the incorporated heat source.

The card storage section 29 is disposed on the side opposite to the card rotating section 4 of the card transport path CP, and has a box shape having the height of from the bottom position of the housing 2 to the height position of the card transport path CP. Inside the card storage section 29, a shelf board to mount discharged cards C is provided to be movable in the vertical direction. Opposite end portions of a spring are respectively fixed the lower surface of the shelf board and the inner bottom of the card storage section 29. Inside the card storage section 29, the cards C subjected to the printing processing or the like are stacked and stored to overlap. In other words, the cards C are stored in the card storage section so that the thickness direction is aligned along the approximately vertical direction.

<Control Section>

Figure 2:
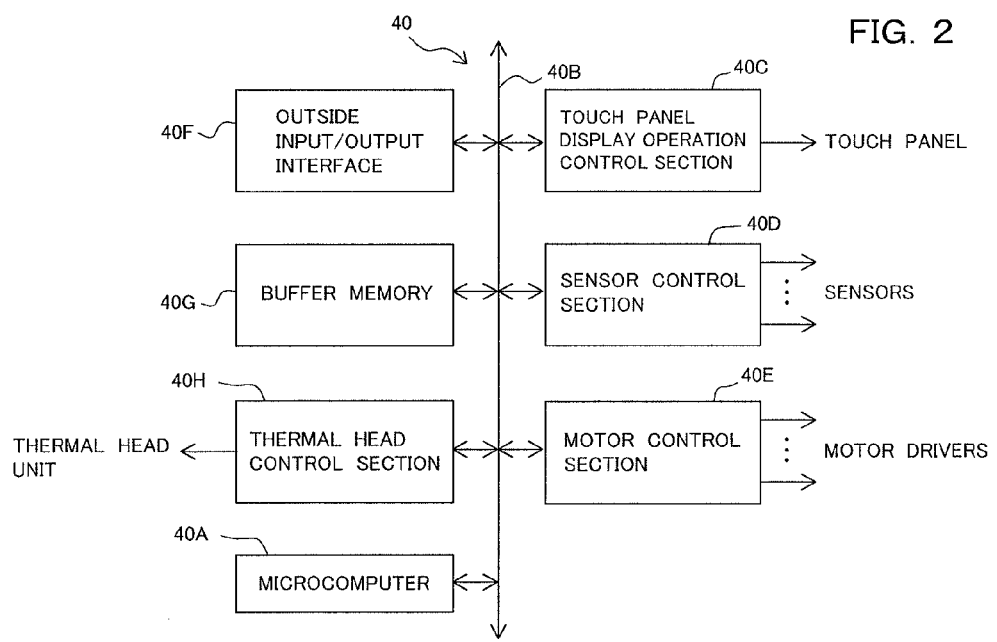
FIG. 2 is a block diagram illustrating details of a control section of the printing device of Embodiment 1.

As shown in FIG. 2, a control section 40 has a microcomputer 40A that performs control processing on the printing device 1 and is comprised thereof. The microcomputer 40A is comprised of a CPU that operates on a high-speed clock as a central processing unit, ROM in which control operation of the printing device 1 is stored, RAM for working as a work area of the CPU, involatile memories such as a flash memory and EEPROM, and internal buses to connect the elements.

The microcomputer 40A is connected to an external bus 40B. The external bus 40B is connected to each of a touch panel display operation control section 40C that controls display of a touch panel (input display section), not shown, and input command, a sensor control section 40D that controls signals from various sensors, a motor control section 40E that controls driving of each motor, an outside input/output interface 40F to communicate with an external device such as a host computer, a buffer memory 40G that temporarily stores image information and the like to print on the card C, and a thermal head control section 40H that controls heat energy to the thermal head 9. Further, although abstracted in FIG. 2, an actuator control section is also connected to control an actuator and the like for travel of the nip rollers 21, 22 between the nip position and the separate position, and travel of the decurl roller DR between the proceeding position and the retracted position.

The printing device 1 operates by the command from the above-mentioned touch panel, and is also capable of operating by a command from the above-mentioned external device via the outside input/output interface 40F. In addition, the printing device 1 has a power supply section that supplies operation power to each of the above-mentioned sections, and a battery device (for example, button-type lithium ion battery) connected to the power supply section as a power supply to ensure operation time for writing required information in the involatile memory after supply of commercial power is shut off.

(Operation)

The operation of the printing device 1 of this Embodiment will be described next focusing on the CPU (hereinafter, referred to as the CPU) of the microcomputer 40A of the control section 40. In addition, when power is supplied to the control section 40, the CPU expands programs and program data in the RAM from the ROM, monitors initial setting processing for positioning each of the above-mentioned components in the home position and output information from an empty sensor, not shown, thereby confirms that the cards C are stored in the card stacker 3, further monitors output information from the above-mentioned various sensors, and thereby confirms that the intermediate transfer film F and the ink ribbon R are installed. When any of them is not stored or installed, the CPU causes an alert to be sounded, displays the message on the above-mentioned touch panel, while in the case of operating by the command from the external device, notifying the external device of the message, performs confirmation processing to confirm whether everything is stored and installed, and transports the intermediate transfer film F and the ink ribbon R to the usable initial position by referring to the involatile memory. Further, to simplify the description, the description is given assuming that the buffer memory 40G of the control section 40 stores image information decomposed to three colors, Y, M and C, and control information received from the external device via the outside input/output interface 40F, the thermal head 9 is in the retracted position, and that a printing command is issued from the external device.

In printing, the CPU waits for a printing command (transfer request), and when the printing command is issued, drives the motor M2 to start transport so that the film winding section 6 winds up the intermediate transfer film F, while driving the motor M5 to start transport so that the ink ribbon winding section 8 winds up the ink ribbon R. By this means, the first mark of the intermediate transfer film F passes through the first mark detection sensor 10, and is positioned on the upstream side in the intermediate transfer film transport direction in image formation (this position is referred to as an initial position of the intermediate transfer film F.) In this state, the thermal head 9 is positioned in the retracted position, the first mark is on the upstream side of the first mark detection sensor 10 in the transport direction in image formation, and the first mark detection sensor 10 does not detect the first mark yet (in the operation of feeding the start of the intermediate transfer film F in image formation). Further, for the ink ribbon R, since the position of the ink ribbon R is managed by the second card detection sensor 11, the front end portion of Y color of the ink ribbon R is positioned to correspond to the printing start position of the intermediate transfer film F (this position is referred to as an initial position of the ink ribbon R.) In other words, the initial positions of the intermediate transfer film F and the ink ribbon R are set so that the distance from a press-contact position in which the thermal head 9 and the platen 12 are in press-contact to the image formation position in the initial position of the intermediate transfer film F is the same as the distance from the press-contact position to the front end portion of Y color of the ink ribbon R.

Next, the thermal head 9 is moved to the printing position. Also in this state, the first mark is on the upstream side of the first mark detection sensor 10 in the transport direction in image formation, and the first mark detection sensor 10 does not detect the first mark yet.

Next, the CPU transports the intermediate transfer film F and the ink ribbon R (in the transport direction in image formation), while monitoring output information (output signal) from the first mark detection sensor 10, thereby determines whether or not the first mark detection sensor 10 detects the first mark, and continues monitoring in a negative determination, while performing feeding for transporting each of the intermediate transfer film F and the ink ribbon R by a predetermined distance in a positive determination. In addition, the intermediate transfer film F and the ink ribbon R are transported at the same time by the same distance. In this state, the intermediate transfer film F (in a strict sense, the position of the intermediate transfer film F corresponding to one image area targeted for image formation) is on the upstream side from the printing start position (position to start formation of an image on the intermediate transfer film F by heating selectively heating elements of the thermal heat 9 for the ink ribbon R), and the preliminary passage of current is started to the thermal head 9. In addition, in the preliminary passage of current, for the thermal head 9, each heating element is heated to the temperature that does not allow ink of the ink ribbon R to be transferred to the intermediate transfer film F i.e. near the upper limit of the temperature that disables coloring. Such a preliminary passage of current is performed to prevent the printing quality from deteriorating due to the fact that the heating elements cannot follow when the heating elements constituting the thermal head 9 are selectively heated immediately after the intermediate transfer film F arrives at the printing start position.

Further, the CPU still continues to transport the intermediate transfer film F and the ink ribbon R, and when both of the intermediate transfer film F and the ink ribbon R arrive at the printing start position (the motor control section 40E performs time management on the DC motors, while performing pulse management on the stepping motor, and it is thereby possible to grasp that the intermediate transfer film F arrives at the initial printing position), selectively heats the heating elements constituting the thermal head 9 to start image formation on the intermediate transfer film F. At this point, as described above, since the ink ribbon R is disposed in order of Y, M, C and BK, in a strict sense, the feeding position of the intermediate transfer film F corresponding to one image area and the feeding position of Y of the ink ribbon R arrive at the printing start position. In addition, such registering processing will be described later.

Furthermore, the intermediate transfer film F and the ink ribbon R are transported continuously, and image transfer to the intermediate transfer film F corresponding to one image area is finished. Shown herein is a printing example using a single color of BK. In performing color printing using three colors of Y, M and C, the thermal head 9 is moved to the retracted position, the output information of the first mark detection sensor 10 and the second mark detection sensor 11 is monitored, and the intermediate transfer film F is thereby transported backward so that the first mark reaches the upstream side in the transport direction in image formation onto the intermediate transfer film F from the location position of the first mark detection sensor 10, while the ink ribbon R is transported backward so that the front end of ink of the next color (M color) of the ink ribbon R corresponds to the initial position of the intermediate transfer film F.

At this point, backward transport is performed until the position of the intermediate transfer film F of one image area and the position of ink (M) of the next color of the ink ribbon R arrive at the initial positions. In this case, the distance from the initial position of the intermediate transfer film F to the printing start position is calculated so that the position of the intermediate transfer film F of one image area and the position of ink (M) of the next color of the ink ribbon R coincide with the printing start position, and backward transport is performed corresponding to the distance.

Details of the distance calculation will be described. When Y is printed, in a state in which the intermediate transfer film F and the ink ribbon R arrive at the printing start position, in order for the printing start position of the intermediate transfer film F and the printing start position of Y to coincide with each other, the position of Y of the ink ribbon is registered in the initial position such that the first mark is on the upstream side of the first mark detection sensor 10 in the transport direction in image formation, and that the first mark detection sensor 10 does not detect the first mark yet. At this point, the distance from the initial position of the intermediate transfer film F to the printing start position is beforehand calculated, and the initial position of the ink ribbon R is determined according to the distance. When printing of Y is finished, next, the initial position of the ink ribbon R in printing M is determined so that the printing position of M and the printing start position of the intermediate transfer film coincide with each other. Next C is in the same manner. In addition, for the ink ribbon R, since the absolute position of the ink ribbon R is managed by detecting BK using the second mark detection sensor 11, the printing quality does not deteriorate unless feeding of the intermediate transfer film F is misregistered.

As described above, when image formation on the intermediate transfer film F by three colors, Y, M and C, is finished, the CPU transports the image formed on the intermediate transfer film F to the image transfer section PT, and executes transfer processing for transferring the image to the card C in the image formation section PF.

In the transfer processing, first, the CPU drives and rotates the card supply roller 18, and feeds the blank card C to the supply path SP from the card stacker 3. The first card transport roller pair disposed on the supply path SP is driven to rotate concurrently with driving of the card supply roller 18, and cleans the printing surface side of the card C, while promoting transport to the card rotating section 4 on the supply path SP. Further, as shown in FIG. 5, concurrently with rotation driving of the first card transport roller pair, the CPU rotates the card rotating section 4, and positions two pinch roller pairs to be positioned on the extension of the supply path SP (this position is referred to as an initial position of the card rotating section 4.) When the position sensor provided on the supply path SP side of the card rotating section 4 detects the driving roller of one pinch roller pair of two pinch roller pairs, the CPU halts rotation driving of the card rotating section 4. When the card locating sensor 15a provided in the vicinity of the card rotating section 4 detects the front end in the transport direction of the card C, the CPU halts rotation driving of the card supply roller 18, while driving and rotating two pinch roller pairs in the card rotating section 4. At the time the blank card is transported by a predetermined distance, the CPU halts rotation driving of the first card transport roller pair and two pinch roller pairs in the card rotating section 4. By this means, the card C is nipped by two pinch roller pairs in the card rotating section 4.

Next, the CPU refers to the control information stored in the buffer memory 40, determines whether the card C is a magnetic card or an IC card, and corresponding to the determination result, rotates the card rotating section 4 a predetermined angle to feed the card C to the magnetic write section 23 or IC write section 24. When the card C is a magnetic card, at the time the card transport direction is turned to the magnetic write section 23 by rotation of the card rotating section 4 i.e. at the time the card C is detected by the position sensor provided on the supply path SP side of the card rotating section 4 and the card transport direction coincides with the direction of the supply path SP, the CPU drives two pinch roller pairs in the card rotating section 4. When the card locating sensor 15d disposed in the vicinity of the card rotating section 4 detects the rear end in the transport direction of the card C, the CPU halts rotation driving of the pinch roller pairs. With one end of the card C held by one of the pinch roller pairs in the card rotating section 4, the magnetic write section 23 records the magnetic information and executes verification. Meanwhile, when the card C is an IC card, as shown in FIG. 6, at the time the card transport direction is turned to the IC write section 24 by rotation of the card rotating section 4 i.e. at the time the card C is detected by the position sensor provided on the IC write section 24 side of the card rotating section 4, the CPU drives two pinch roller pairs in the card rotating section 4. When the card locating sensor 15b disposed in the vicinity of the card rotating section 4 detects the rear end in the transport direction of the card C, the CPU halts rotation driving of the pinch roller pairs. With one end of the card blank held by one of the pinch roller pairs in the card rotating section 4, the IC write section 24 records the electronic information and executes verification.

Further, the CPU refers to the control information stored in the buffer memory 40, determines whether or not to need to record barcode information on the card C, and corresponding to the determination result, rotates the card rotating section 4 a predetermined angle to feed the card C to the barcode write section 28. At this point, at the time the card transport direction coincides with the direction of the card transport path CP by rotation of the card rotating section 4 i.e. at the time the card C is detected by the position sensor provided on the card transport path CP side of the card rotating section 4, the CPU drives two pinch roller pairs in the card rotating section 4. When the card C is transported to the barcode write section 28 by a predetermined distance, the CPU halts rotation driving of the pinch roller pairs. With one end of the card C held by one of the pinch roller pairs in the card rotating section 4, the barcode write section 28 adds the barcode information and executes verification.

Upon receiving the card C subjected to information recording on the card C from the magnetic write section 23, IC write section 24 or barcode write section 28, corresponding to the verification result, the CPU determines whether to transport the card C to the eject box 25 or to the second card transport roller side on the card transport path CP. In determining to transport to the eject box 25, at the time the card C is detected by the position sensor provided on the IC write section 24 side of the card rotating section 4 and the card transport direction coincides with the direction of the IC write section 24, the CPU drives two pinch roller pairs in the card rotating section 4 to transport to the eject box 25, and then, performs the above-mentioned processing again from supply of the blank card C by the card supply roller 18.

Meanwhile, when the CPU determines to transport to the second card transport roller side on the card transport path CP, at the time the card C is detected by the position sensor provided on the card transport path CP side of the card rotating section 4 and the card transport direction coincides with the direction of the card transport path CP, the CPU drives two pinch roller pairs in the card rotating section 4, and transports the card C to the card transport path CP. When the card locating sensor 15c disposed in the vicinity of the card rotating section 4 detects the front end in the transport direction of the card C, the CPU drives and rotates the transport roller arranged on the card transport path CP. When the card locating sensor 16 detects the front end in the transport direction of the card C, the CPU halts rotation driving of the pinch roller pairs of the card rotating section 4, and halts the transport roller arranged on the card transport path CP. By this means, the card C is once nipped by the second and third card transport roller pairs.

After the card C is nipped by the second and third card transport roller pairs (because of preventing the quality of the image on the intermediate transfer film F from degrading due to local pressurization by the nip rollers 21, 22 when transport is resumed, if transport of the intermediate transfer film F with the image formed is once halted), the CPU moves the nip rollers 21, 22 to the nip position, and transports the intermediate transfer film F such that the image of one image area is formed in the image formation section PF to the image transfer section PT. This transport is performed by driving the motor M1 and stepping motor M3 while checking detection of the first mark by the transfer locating sensor 14. Prior to the transport processing, the CPU heats the heating lamp of the heat roller 20 to move forward to the proceeding position.

When the transfer locating sensor 14 detects the first mark, the CPU drives and rotates the transport roller arranged on the card transport path CP, and transports the card C nipped by the second and third card transport roller pairs to the image transfer section PT. By this means, the intermediate transfer film F and the card C are transported to the image transfer section PT at the same speed, the card C is supported on its upper side (backside) by the rotating platen roller 27, while being heated on its lower side (frontside) by the heat lamp 20 via the image formation position of one image area of the intermediate transfer film F, and the image of one image area of the intermediate transfer film F is thereby transferred to the card C.

After finishing image transfer, the card C is still transported to the downstream side on the card transport path CP, and when the card locating sensor 17 detects the front end in the transport direction of the card C, the CPU halts rotation driving of the transport roller arranged on the card transport path CP. By this means, the card C is once nipped by the fourth and fifth card transport roller pairs. In this state, the decurl roller DR is positioned in the proceeding position, and corrects skew of the card C. After positioning the decurl roller DR in the retracted position, the CPU drives the transport roller arranged on the card transport path CP in the backward rotation direction, and transports backward the card C to the card rotating section 4 on the card transport path CP. At the time the card locating sensor 15c detects the front end in the transport direction of the card C, the CPU drives and rotates the pinch roller pairs in the card rotating section 4. At the time the card locating sensor 15c detects the rear end in the transport direction of the card C, the CPU halts rotation driving of the transport roller arranged on the card transport path CP and the pinch roller pairs in the card rotating section 4. By this means, the card C is nipped again by two pinch roller pairs in the card rotating section 4.

Next, the CPU rotates the card rotating section 4 nipping the card C 180 degrees. By this means, the card C is reversed and positioned with the lower side (frontside) turned to the backside. Then, the card C is transported to the second card transport roller pair side, and nipped by the second and third card transport roller pairs, and subsequent control is already disrobed and therefore, omitted.

Generally, since there are many cases that information related to the card C is printed on the backside of the card C, the cases will be described in the Embodiment. By performing the above-mentioned printing processing with one color of BK, an image of one image area is formed on the intermediate transfer film F. In this respect, the processing content differs from the content of the printing processing as described already, but is the same except the respect, and the description is omitted. Further, the processing differs in the respects that the blank card C is not supplied from the card stacker 3 in the transfer processing, and that magnetic or electronic information or barcode information is not recorded on the card C. Since the card is already nipped by the second and third transport roller pairs, it is essential only that the image transfer section PT transfers the image formed on the intermediate transfer film F to the backside, and the description is redundant, and is omitted.

After finishing image transfer to the backside, the card C is still transported to the downstream side on the card transport path CP, and is discharged outside the housing 2 via a discharge outlet formed in the outer surface of the housing 2. In this position is disposed the card storage section 29 that stores the cards C subjected to the printing and information recording processing. The cards C discharged from the housing 2 are stacked to overlap on the shelf board inside the card storage section 29. By this means, the cards C are stored in the card storage section 29 while being aligned. When the card is not stored in the card storage section 29, the shelf board is positioned in the upper portion inside the card storage section 29 by biasing of the spring. When storage of the card C is started in the card storage section 29, as the number of stored cards increases, by their weight, the shelf board moves downward, and storage space in the upper portion is ensured.

After a lapse of predetermined time since the card locating sensor 17 detects the card rear end in the transport direction, the CPU halts rotation driving of the transport roller arranged on the card transport path CP and two pinch roller pairs of the card rotating section 4, drives the motor M1 to rewind the intermediate transfer film F to a predetermined position, and stores the position information of an unused image area of the intermediate transfer film F in the nonvolatile memory. By this means, printing on a single card C is finished.

(Action and Others)

The action and others of the printing device 1 of this Embodiment will be described next.

In the printing device 1 of this Embodiment, the card stacker 3 is provided on the top side of the cover body 2A disposed at the top of the housing 2. Therefore, it is possible to increase the card stacker 3 corresponding to the length of the cover body 2A, and by storing the cards C to be placed parallel in a laminate manner inside the card stacker 3, it is possible to increase the supply number of cards C. Inside the housing 2, the card transport path CP is disposed below the cover body 2A, and the printing section PR is disposed below the card transport path CP. Therefore, since the card transport path CP is positioned in the upper portion inside the housing 2, it is possible to increase the height of the card storage section 29 disposed outside the housing 2 on the most downstream side of the card transport path CP. Accordingly, it is possible to store all cards C, which are supplied from the card stacker 3 and are subjected to processing of printing, information recording and the like, in the card storage section 29, and it is thereby possible to support large-amount discharge in response to large-amount supply. Further, since the printing section PR is disposed below the card transport path CP and the card stacker 3 is provided on the top side of the cover body 2A, it is possible to decrease the size of the entire device enabling large-amount processing.

Further, in the printing device 1 of this Embodiment, the card stacker 3 is configured to be detachable and attachable with respect to the cover body 2A. Therefore, by preparing card stackers 3 for each type and/or size of card C, operation for replacing cards C to supply is made ease, and it is possible to easily support various kinds of cards C. Furthermore, since the printing section PR is provided below the card transport path CP, the card transport path CP is disposed in the vicinity immediately below the cover body 2A. Therefore, by removing the card stacker 3 from the cover body 2A and opening the cover body 2A, it is possible to access the card transport path CP from the opening at the top of the cover body 2A with ease (see FIG. 4). By this means, even when a card jam or the like occurs, it is possible to improve jam clearing performance. Further, since the printing section PR is provided in between the magnetic write section 23 and the card storage section 29, the image transfer section PT in which a jam tends to occur frequently is disposed in the substantially center portion of the card transport path CP, and it is thereby possible to improve efficiency of jam clearing operation. Furthermore, since the card transport path CP is disposed in the vicinity immediately below the cover body 2A, the need for removing the ink ribbon R and/or intermediate transfer film F is eliminated in jam clearing, and it is thereby possible to avoid the adhesion of dust to the ink ribbon R and intermediate transfer film F.

Furthermore, in the printing device 1 of this Embodiment, the IC write section 24 is disposed above the card transport path CP, while being below the card stacker 3 in between the image transfer section PT and the card rotating section 4. Therefore, it is possible to effectively use space inside the housing 2, and to contribute to miniaturization of the entire device. In this arrangement, even when a jam occurs in the image transfer section PT, it is possible to avoid interference of the IC write section 24 in jam clearing operation.

Still furthermore, in the printing device 1 of this Embodiment, the recording processing is performed with one end of the card C held by the pinch roller pair in the card rotating section 4, in performing the recording processing of magnetic information by the magnetic write section 23, recording processing of electronic information by the IC write section 24, and recording processing of barcode information by the barcode write section 28 (also see FIG. 6). Therefore, it is not necessary to provide driving mechanisms in the magnetic write section 23, IC write section 24 and barcode write section 28. By this means, it is possible to contribute to miniaturization of the entire device, and to reduce energy consumption corresponding to no need of the driving mechanisms. Further, in the printing device 1, the barcode write section 28 is disposed on the extension of the card transport path CP outside the housing 2 on the card rotating section 4 side. Therefore, when the barcode information is not needed, it is possible to remove the barcode write section 28, and to improve versatility.

Moreover, in the printing device 1 of this Embodiment, the magnetic write section 23 is disposed on the extension of the supply path SP on the side opposite to the card stacker 3 in the card rotating section 4 i.e. below the card rotating section 4. Therefore, when the card C is positioned toward the magnetic write section 23 in recording the magnetic information on the card C, it is possible to share the position sensor provided on the supply path SP side of the card rotating section 4 (also see FIG. 5). Further, the IC write section 24, card rotating section 4 and eject box 25 are disposed linearly, and the eject box 25 is disposed on the side opposite to the IC write section 24 in the card rotating section 4. Therefore, in discharging the card C failing in the recording processing, when the card C is positioned toward the eject box 25, it is possible to share the position sensor provided on the IC write section 24 side of the card rotating section 4 (also see FIG. 6). Accordingly, the need of position sensors on the magnetic write section 23 side and on the eject box 25 side is eliminated, and it is thereby possible to reduce the number of sensors in the card rotating section 4.

Then, in the printing device 1 of this Embodiment, standby space corresponding to a single card C is formed on the card transport path CP between the second card transport roller pair having the transport roller 19b and the platen roller 27 constituting the image transfer section PT. Therefore, when the image transfer section PT executes image transfer, it is possible to perform the recording processing of magnetic information or electronic information in the magnetic write section 23 or IC write section 24 by rotation of the card rotating section 4, and therefore, it is made possible to perform parallel processing of the printing processing and the recording processing.

In addition, this Embodiment shows the example in which the barcode write section 28 is disposed on the extension of the card transport path CP, but the invention is not limited thereto. As a substitute for the recording processing of barcode information, for example, it is possible to configure so that electronic information is stored in an IC incorporated into the card C. In this case, the IC write section 24 performs recording processing on a non-contact type IC, while recording processing is performed on a contact type IC, and it is thus possible to use separately. Moreover, it is possible to adopt a configuration for performing recording processing for enabling various kinds of demands to be supported.

Further, this Embodiment shows the example in which the printing section PR performs the printing processing after the recording processing in the magnetic write section 23 and IC write section 24, but the invention is not limited thereto, and the sequence of the recording processing and the printing processing may be changed to perform. In this case, by controlling the blank card C transported from the card stacker 3 to the card rotating section 4 to be fed onto the card transport path CP, it is possible to perform the printing processing before the recording processing.

Furthermore, this Embodiment shows the example in which the film winding section 6 is disposed below the film supply section 5, but the invention is not limited thereto, and the positions of the film supply section 5 and the film winding section 6 may be interchanged. Still furthermore, the example is shown in which the ribbon winding section 8 is disposed above the ribbon supply section 8, but the invention is not limited thereto, and it is naturally possible to interchange the positions of the ribbon winding section 8 and the ribbon supply section 7. Moreover, this Embodiment shows the example of using DC motors respectively in the supply sections and winding sections of the intermediate transfer film F and the ink ribbon R, and it is also possible to use a common DC motor in the supply section and the winding section with a gear mechanism.

Embodiment 2

Embodiment 2 according to the invention will be described next with reference to FIGS. 7 to 18. In Embodiment 2, it is possible to store a large amount of cards in storing a plurality of cards in a medium feed section, while facilitating operation for adding cards and operation for removing a failed card. Further, in Embodiment 2, in performing a plurality of types of processing of information recording and image formation on a recording medium, it is possible to perform parallel processing on a plurality of cards, while miniaturizing the transport path of recording media, information recording mechanism and image formation mechanism. In addition, components having the same functions as in Embodiment 1 are assigned the same reference numerals, but sensors such as card locating sensors 15a to 15e, ink ribbon R mark detection sensor 11 and transfer locating sensor 14 in Embodiment 1 are changed to numerals of Se1 to Se12 in Embodiment 2 to describe. Embodiment 2 according to the invention will be described below.

Figure 12:
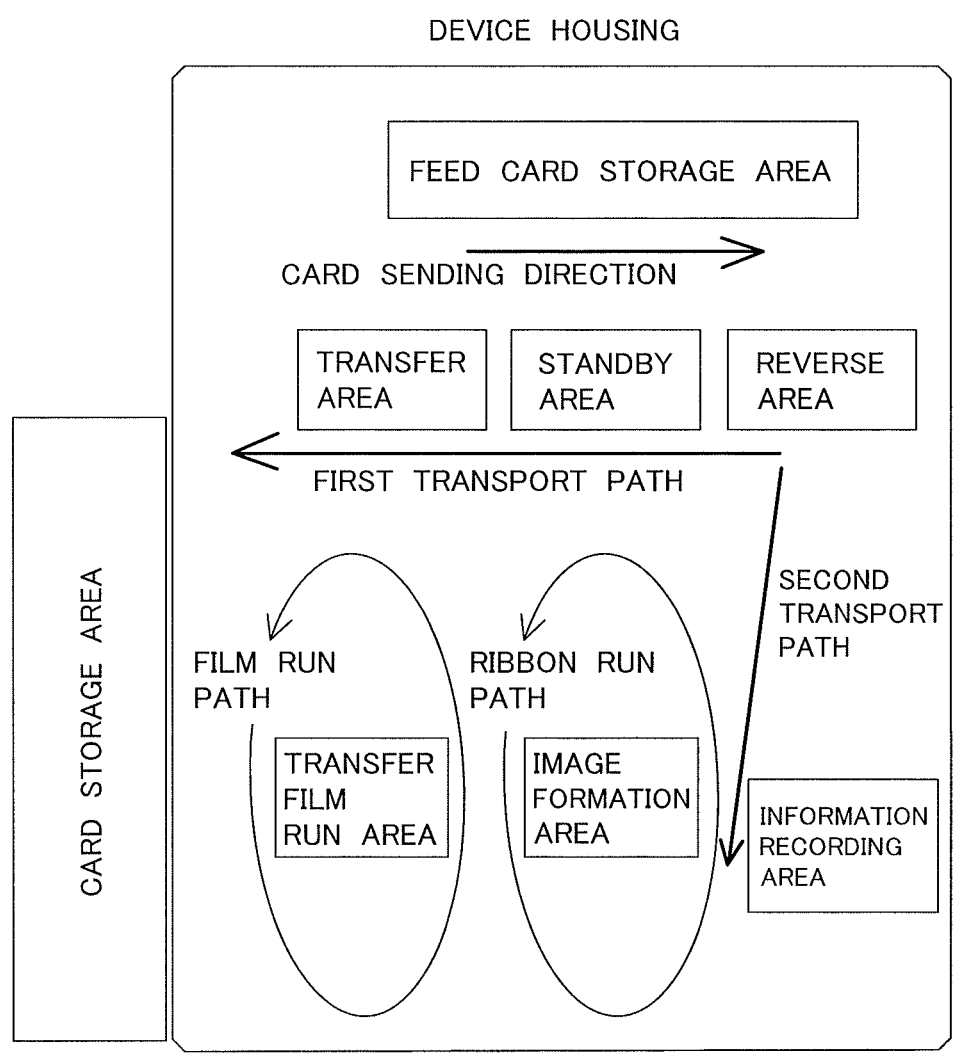
FIG. 12 is a conceptual diagram showing a layout configuration of the device of FIG. 7.

First, FIG. 12 is a conceptual diagram showing a layout configuration of a device of FIG. 7, and according to FIG. 12, a layout of each configuration will be described.

In the device housing 2 are disposed a card supply section CA, and the card rotating section 4 for changing the direction of a card C as a printing medium fed from the card supply section CA. On the downstream side of the card rotating section 4 are disposed a first transport path P1 for carrying the card in the first direction, and a second transport path P2 for carrying the card C in the second direction. In the device of FIG. 7, a third transport path P3 for transporting the card C in the third transport direction is disposed separately from the second transport path P2.

In such a layout configuration, the card supply section CA is comprised of the card stacker 3 provided with a card storage section for aligning and storing a plurality of cards C in a standing posture (see FIGS. 7 to 9) forward and backward, and a supply opening for feeding the card, and the direction for sending out the card C (direction of arrow X in FIG. 2), and the card transport direction (direction of arrow Y in FIG. 2) of the first transport path P1 are disposed in the substantially parallel directions in mutually opposite directions. In other words, since the card stacker 3 positioned in the upper portion of FIG. 2 and the first transport path P1 are disposed parallel in lower and upper portions, the storage area of cards C and image transfer mechanism (transfer platen 27 and standby section E described later) are laid parallel in upper and lower portions, and it is intended to make the device compact.

The card rotating section 4 is provided below and adjacent to the card supply section CA, and is disposed on one end side (right side in FIG. 12) of the device housing 2. Then, on the downstream side of the card rotating section 4, the first transport path P1 is disposed in the approximately horizontal direction, and the second transport path P2 is disposed in the approximately vertical direction. The first and second transport paths P1 and P2 are disposed in different angular directions, are preferably disposed in the angular range of 90 degrees to 180 degrees as shown in the figure, and are set in an appropriate angular range in consideration of densely configuration of paths.

Figure 13:
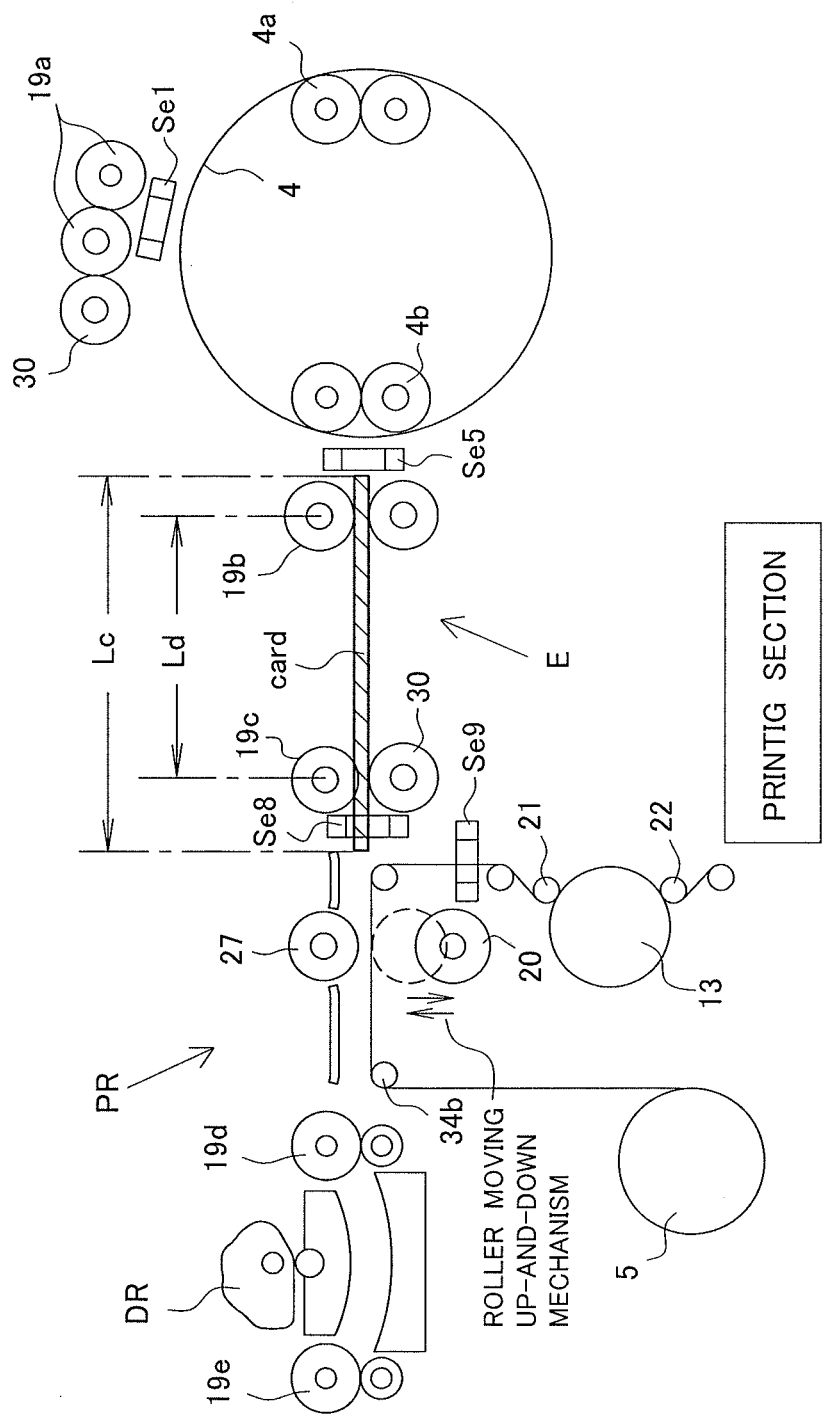
FIG. 13 is a detailed explanatory view of a standby section in the device of FIG. 7.

In the first transport path P1 are disposed the standby section E and the printing section PR to transfer, and the standby section E is disposed in between the card rotating section 4 and the printing section PR. As shown in FIG. 13, the standby section E is comprised of the transport roller 19b, its driven roller (hereinafter, referred to as a transport roller pair 19b), transport roller 19c and its driven roller (hereinafter, transport roller pair 19c) at a distance Ld shorter than the transport length Lc of the card C. The printing section PR is comprised of the transfer platen (in the device shown in the figure, platen roller 27), supports the card C to back up, and transfers an image to the surface (the lower surface in FIG. 13). In the platen, the heat roller 20 to transfer is disposed to move up and down between a standby position separate from the card C and an operating position to come into contact with the card C.

The transfer film F is provided between the transfer platen roller 27 and the heat roller 20. The device as shown in the figure is provided with a transfer film cassette 50, as described later, and the transfer film cassette 50 is disposed below the first transport path P1 together with a ribbon cassette 42, described later.

The transfer film F stored in the transfer film cassette 50 is provided with a film path P4 to run between the transfer platen 27 and the image formation section PF. The image transfer section PT is disposed in the arrangement space of the standby section E of the first transport path P1 below the transport path. Then, the image formation section PF is comprised of the platen roller 12 for image formation and the thermal head 9 disposed opposite the platen roller, and is configured so that the ink ribbon R runs in between the roller and head. The configuration of the ink ribbon will be described in the ribbon cassette, described later.

In thus configured image formation section PF, the card rotating section 4 and the standby section E of the first transport path P1 are positioned in the upper portion, and the second transport path P2 and an upper recording area of a magnetic recording mechanism and the like, described later, of the path are positioned in the side portion. Then, the ribbon cassette 42 and the transfer film cassette 50 are disposed in this order in between the card rotating section 4 of the first transport path P1 and the image transfer section PT.

As described above, the first transport path P1 and the second transport path P2 are disposed in the different angular directions via the card rotating section 4 as described above, and the ribbon cassette 42 and the transfer film cassette 50 are disposed in an area surrounded by both paths to form an intermediate transfer area. Then, the standby section E is disposed in the first transport path between the card rotating section 4 and the printing section PR, and the image formation section PF is disposed below the section E. By such a layout configuration, it is possible to densely configure the device and to achieve the compact device.

[Card Supply Section]

A configuration of the card supply section CA in the device of FIG. 7 will be described. In the device of FIG. 7, the card stacker 3 of the card supply section CA is configured in a cassette form (card cassette), and is inserted in a stacker installation opening formed in the device housing 2 to enable load and unload. Accordingly, by pulling up the card stacker 3 with a grip, not shown, the card stacker 3 is detachable upward (in the substantially same direction as the card supply direction, described later), and when a card jam occurs in the supply section, it is possible to clear the jam by removing the card stacker 3. As shown in FIG. 8, the card stacker 3 is comprised of a box-shaped housing 3a (hereinafter, referred to as the "housing"), and a card storage section 104 provided inside the housing. The card storage section 104 (printing media storage section) is comprised of storage space adapted to card dimensions for enabling a plurality of cards that are printing media to be aligned and stored in a standing posture. The card storage section 104 is provided with an opening portion 104a to load and unload the card C in the upper portion shown in the figure, and is hinge-coupled to an open/close cover 3b to open and close the opening portion.

As shown in FIGS. 8 and 9, the card storage section 104 is configured in a space form to align the cards C from one end (left end viewed in the figure) to the other end (right end) to store in a standing posture. In the space are provided a card placement surface 105 as the printing media placement surface to place the cards C in a standing posture, and a card lock surface 106 as the printing media lock surface that locks the front card C.

The card placement surface 105 and the card lock surface 106 hold the cards in a forward-tilting posture. Therefore, the card placement surface 105 is comprised of an inclined surface 105a or step surfaces 105b with a height difference 4d in the sending direction (arrow X direction). Further, the card lock surface 106 is formed of an inclined surface 106a that locks the card C in a forward-tilting posture. In other words, the sending direction is the direction toward the card lock surface 106 in the card collection direction.

By configuring the card placement surface using a plurality of step surfaces lowering stepwise in the sending direction as in this Embodiment, the card lower end edge placed in a standing posture is locked by the step portion, and the card does not fall in a forward-tilting posture direction. By this means, when the card stacker 3 is removed to add cards C, the cards do not fall, and addition operation is made ease.

FIG. 9(a) is a configuration view of the card section 104, FIG. 9(b) shows the case of configuring the card placement surface 105 using the step surfaces 105b, FIG. 9(c) shows the case of configuring the surface 105 using the inclined surface 105a, the height difference Δd lowering in the sending direction X is formed in both cases, and the inclined surface 106a of the card lock surface 106 is formed at an angle θ adapted to the height difference Δd.

In addition, although not shown in the figure, the card lock surface 106 does not need to be always formed of a flat surface, and may be formed of protrusions that lock the card front in a forward-tilting posture. In this case, protrusions contacting the card upper portion and protrusions contacting the card lower portion are provided with a height difference.

Figure 10:
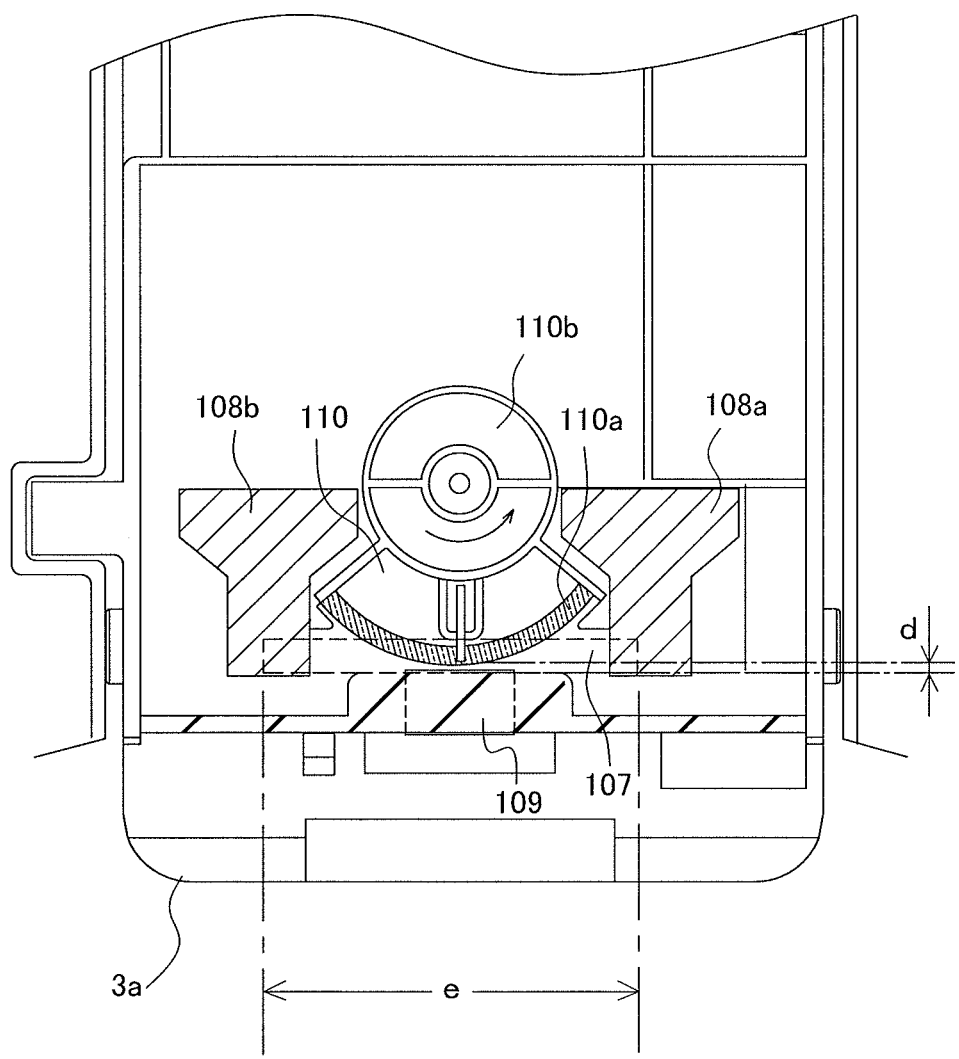
FIG. 10 is a bottom view of the device of FIG. 8.

The card storage section 104 is provided with the medium feed opening 107 at its front end portion in the sending direction. The medium feed opening 107 is comprised of an opening for enabling the front card C to be carried outside the housing. Then, as shown in FIG. 9, the opening 107 is formed in the shape of a slit for carrying out the front card C locked in a forward-tilting posture by the card lock surface 106 from the bottom of the housing 3a to the outside. The medium feed opening 107 has a slit thickness (d) adapted to the card thickness and width (e) as shown in FIG. 10, and is formed in the slit thickness (d) for allowing only the front card C to pass through. The medium feed opening 107 constitutes separating means for separating the card C on a card-by-card basis in sending the card C with a pick-up roller 18, described later.

In the device shown in the figure, concurrently with the medium feed opening 107 separating the card C, as shown in FIG. 10, separation pads 108a, 108b at card opposite end portions (or may be in one center portion) and an idle roller 109 are disposed opposite each other and form the separating means. Then, the separation pad 108a (108b) is made of an elastic material such as rubber with a high coefficient of friction, and separates the card C in between the pad and the idle roller 109. In other words, the separation pads 108a, 108b separate two sheets or more passing through the above-mentioned slit thickness (d). Concurrently therewith, the slit thickness (d) is configured to be adjustable corresponding to the thickness of the card C to store. In addition, when the card stacker 3 is removed from the device, the separation pads 108a, 108b hold the card C, and the card does not thereby run out.

As shown in FIG. 10, the adjustment mechanism as shown in the figure is formed of an eccentric cam 110, the cam surface 110a is formed to be able to vary the slit thickness (d) shown in the figure gradually, and the rotation angle is set with an adjustment knob 110b.

The card storage section 104 is provided with a picker opening 111 that engages the pick-up means 18, described later, in the surface of the front card. The picker opening 111 is formed as an opening that engages the pick-up roller 18, described later, in the front card C. The picker opening 111 is disposed in between the card lock surface 106 as described above and the medium feed opening 107, and the card lock surface 106, picker opening 111 and medium feed opening 107 are disposed in this order along the card feed direction Y (shown by the arrow in FIG. 9).

Thus, the picker opening 111 and the medium feed opening 107 are disposed with respect to the card lock surface 106 that supports the card C in a forward-tilting posture, and therefore, triangular space Ar as shown in FIG. 9 is formed. By arranging the pick-up roller 18, described later, inside the space, it is possible to reduce the space of the device.

Figure 11:
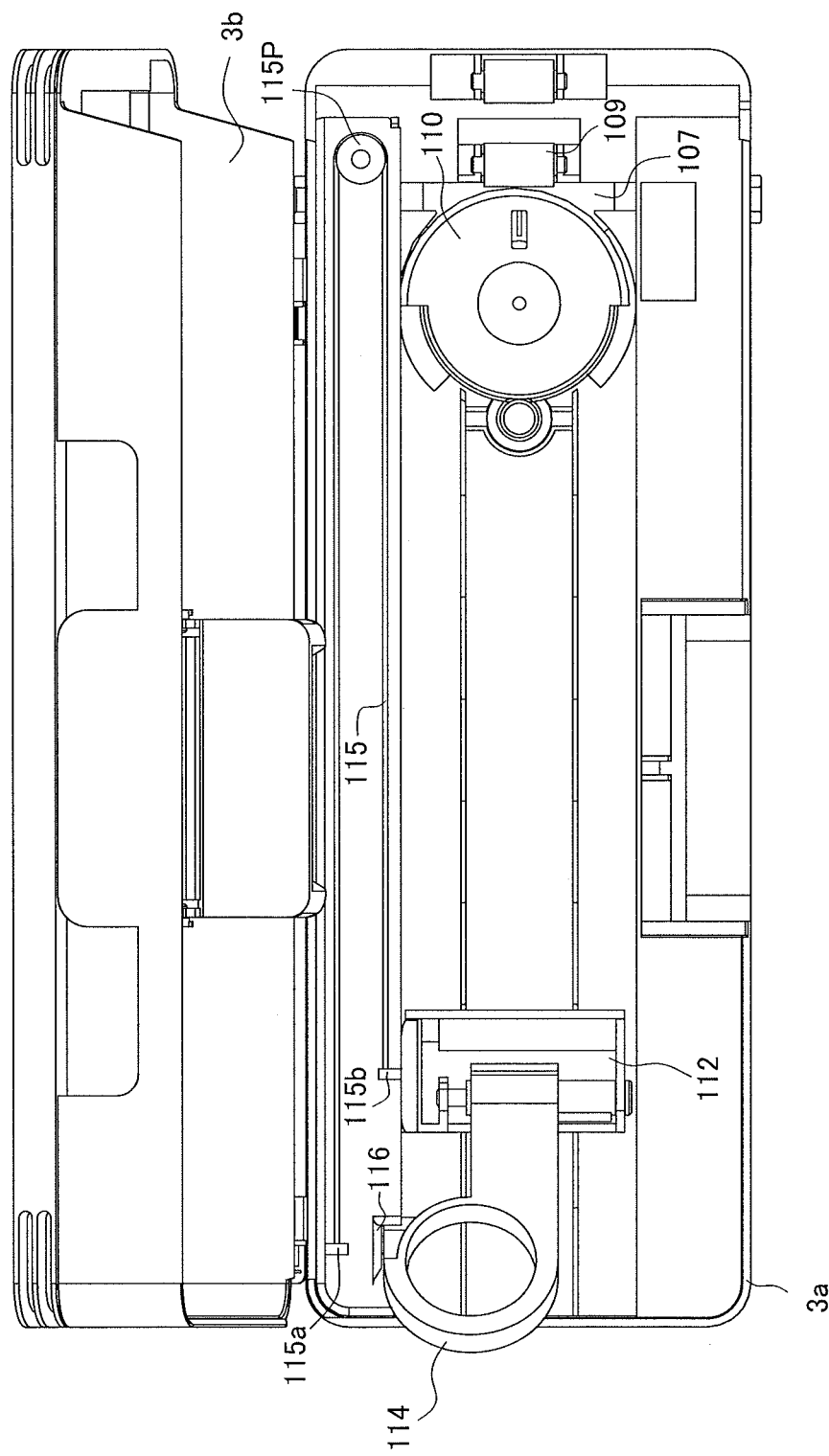
FIG. 11 is a top view of the device of FIG. 8.

As shown in FIG. 9, the card storage section 104 is provided with a support member 112 that is a support member for supporting the back of the backmost card stored in the card storage section 104. The support member 112 is comprised of a member such as a plate member and a block member that press-supports the back of the card C, and sends out the cards C, which are aligned and stored in a standing posture, in the sending direction X. In the device as shown in the figure, as shown in FIGS. 7 and 11, the support member 112 is supported slidably in the sending direction X by a guide groove 13 formed on the inner wall of the housing 3a. The support member 112 is integrally provided with an operation knob 114, and by operating the knob, is movable between an operating position for supporting the card C and a retracted position retracted therefrom.

The support member 112 is provided with a biasing means 115 for biasing the member 112 in the sending direction of the card C. The biasing means 115 shown in the figure is comprised of a spring, and one end 115a of the spring is fixed to the housing 3a, while the other end 115b is fixed to the support member 112. "115P" shown in the figure denotes a pulley that supports the spring in a U-turn shape. Then, as shown in FIG. 11, the biasing means 115 is disposed on the side surface portion of the housing 3a.

In addition, a taper surface 112x is provided in the upper portion of the support member 112 so as to create a gap between the member and the card C. Accordingly, in the case of adding the low number of cards C, with the support member 112 pressing the card C, it is possible to add the cards C by inserting the cards in the tapered surface, and it is not necessary to move the support member 112 with the operation knob 114. Further, the operation knob 114 is hinge-coupled to the support member 112 to be swingable, and the member of the device is locked in a latch groove 116 as shown in FIG. 11. By locking in the latch groove 116, the support member 112 is held in the retracted position. The operation knob 114 locked in the latch groove 116 inhibits close of the open/close cover 3b in the dashed-line state in FIG. 8. By this means, in a state in which the support member 112 is locked in the retracted position, it is possible to inhibit close of the open/close cover 3b, and only when the support member 112 is in the operating state, it is possible to close the open/close cover 3b.

In addition, "18" shown in FIG. 9 denotes the pick-up roller, and "109" denotes the separation roller (idle roller) to form the gap. "19a" shown in the figure denotes a carry-in roller, and transports the card C sent out of the medium feed opening 107 to the downstream side. "30" shown in the figure denotes a cleaning roller in press-contact with the carry-in roller 19a, and removes dust adhering to the carry-in roller 19a.

In addition, it may be configured that the carry-in roller 19a is provided with adhesion, the cleaning roller 30 is further provided with stronger adhesion, the carry-in roller 19a thereby removes dust from the card C, and that the cleaning roller 30 further removes dust of the carry-in roller 19a.

Then, on the downstream side of the card stacker 3, the card rotating section 4 as a change section is disposed, and is configured to enable the card C fed from the card stacker 3 to turn in a predetermined angular direction.

[Configuration of the Card Rotating Section]

Described next is the card rotating section 4 disposed on the downstream side of the card supply section CA. As shown in FIG. 7, the carry-in roller 19a is disposed on the downstream side of the medium feed opening 107 of the card stacker 3. Then, the card C sent out of the card stacker 3 is fed to the card rotating section 4 by the carry-in roller 19a. The card rotating section 4 is comprised of a rotating frame axially supported by the device frame (not shown) to be rotatable, and a pair or a plurality of roller pairs supported by the frame.

In the device as shown in the figure, two roller pairs 4a, 4b spaced a distance in front and in the back are axially supported by the rotating frame to be rotatable. Then, the rotating frame turns in a predetermined angular direction by a turn motor (pulse motor or the like), and the roller pairs attached to the frame are configured to rotate in forward and backward directions with a transport motor. The driving mechanism is not shown in the figure, but for example, it is configured that a single pulse motor is used and that the turn of the rotating frame and rotation of roller pairs are switched using a clutch.

Accordingly, the card C prepared in the card stacker 3 is sent out by the card supply roller 18, separated on a card-by-card basis by the separation gap of the medium feed opening 107, and fed to the card rotating section 4 on the downstream side. Then, the card rotating section 4 carries the card C into the unit by the roller pairs 4a, 4b, and changes the position in the predetermined angular direction while nipping the card by the roller pairs.

On the downstream side of the card rotating section 4, the first transport path P1, second transport path P2 and third transport path P3 described later are disposed in respective angular directions. Then, a magnetic recording unit 23 is incorporated into the second transport path P2, and records magnetic information on a magnetic stripe of the card C fed from the card rotating section 4. The magnetic recording unit 23 shown in the figure is comprised of a read/write head, and is configured to read the recorded information to determine correct or wrong concurrently with recording of the magnetic information.

Further, a non-contact IC recording unit 127 is incorporated into the third transport path P3, and records information on an IC that is beforehand built-in the recording medium. Furthermore, the eject box (reject stacker) 25 and barcode reader are disposed in the outer region of the card rotating section 4 in the turn direction thereof. For example, the barcode reader is a unit to read a barcode printed in the image formation section PF, described later, and determine correct or wrong (error determination).

Accordingly, when the roller pairs 4a, 4b move the card C, of which position is changed to the predetermined angular direction by the card rotating section 4, to the recording unit, it is made possible to input data on the card magnetically or electronically. Further, when a recording error occurs in any of the data input units, the card is carried out to the eject box (reject stacker) 25.

[Configuration of the First Transport Path]

The first transport path P1 is disposed on the downstream side of the card rotating section 4. The printing section PR for transferring an image to the intermediate transfer film F is disposed in the first transport path P1, and forms the image on the card C fed from the card rotating section 4. The roller pairs (which may be belts) 19b, 19c are disposed on the upstream side of the printing section PR in the first transport path P1, and are coupled to a transport motor, not shown. A group of transport roller pairs 19b, 19c is configured to enable switching between forward rotation and backward rotation, and is able to transport the card C from the printing section PR to the card rotating section 4, concurrently with transport of the card C from the card rotating section 4 to the printing section PR.

[Configuration of the Standby Section]

In the first transport path P1, the standby section E is disposed on the upstream side of the printing section PR. In the standby section E, as shown in FIG. 13, the transport roller pair 19b and the transport roller pair 19c are disposed at a distance Ld shorter than the length Lc in the transport direction of the card C. The card C is held by the group of transport roller pairs 19b, 19c spaced a distance in front and in the back, and waits temporarily. Therefore, transmission clutches (not shown) are provided in between the transport roller pairs 19b, 19c and the driving motor, and by turning the clutches to the OFF state, it is possible to halt the card C to wait. The transport roller pairs 19b, 19c are disposed in between the card rotating section 4 and the printing section PR to transfer, described later. Further, the sensor Se5 to detect carry-in and carrying-out of the card C with respect to the card rotating section 4 is disposed in between the card rotating section 4 and the transport roller pair 19b, and is capable of detecting the presence or absence of the card C inside the card rotating section 4.

In addition, in a state in which the card C waits, the card front end exists on the upstream side from the heat roller 20, described later. By this means, since the front end portion of the waiting card C is not heated by the heat roller 20, there is no fear that fluctuations occur in the image transferred to the card C. Further, in the case where the card front end is bent, when the card C is caused to wait on the heat roller 20, there is a fear that the card C rubs the transfer film F, described later, to damage. In this Embodiment, since the standby section E is disposed on the upstream side of the printing section PR, the transfer film F is not damaged. Furthermore, in the state in which the card C waits, the card rear end exists in between the transport roller pair 19b and the sensor Se5 (in the state of passing through the sensor Se5). Accordingly, even when the card rotating section 4 turns during standby of the card, the section 4 does not come into contact with the card C.

Thus, by arranging the standby section E in the first transport path P1 between the card rotating section 4 and the printing section PR, it is possible to control separately a job for recording the magnetic information in the second transport path P2 and a job for recording the IC information in the third transport path P3 positioned on the upstream side, and a job for forming an image in the first transport path P1 positioned on the downstream side. Then, the standby position E is provided in between the card rotating section 4 and the printing section PR in the first transport path for forming an image on the card, the image formation section for forming the image on the transfer film is disposed parallel in the space occupied by the standby section E, and it is thereby possible to make the device small and compact.

Accordingly, for example, when a defect such as a jam occurs in the transfer film F or a defect occurs in the ink ribbon R in the image formation job in the first transport path P1 on the downstream side, without halting the device, it is possible to control to halt the device after finishing the job of information recording in the second transport path P2 on the upstream side.

[Configuration of the Printing Section (Image Transfer Section)]

In the first transport path P1, the printing section PR is disposed on the downstream side of the standby section E. As shown in FIG. 13, the printing section PR is comprised of the transfer platen roller 27 (hereinafter, referred to as the platen roller 27) that supports the card C to back up, and the heat roller 20 is disposed opposite the platen roller 27. The heat roller 20 moves up and down between the standby position (solid-line state in FIG. 13) separate from the platen roller 27 and the operating position (dashed-line state in FIG. 13) for nipping and pressing the card C with the platen roller 27. The moving up-and-down mechanism is not shown, but for example, is comprised of a shift cam and a driving motor that drives the cam.

Then, the transfer film F is wound to be able to run between the platen roller 27 and the heat roller 20. The heat roller 20 is comprised of a heat roller, and fuses image ink formed on the transfer film F onto the card C. Therefore, at least one (the transfer roller in the device shown in the figure) of the platen roller 27 and the heat roller 20 is driven to rotate, and the velocity is set to coincide with the transport velocity of the card C and the travel velocity of the film. Further, the heat roller 20 shifts from the standby state to the operating state at timing at which the card front end that is sent out by the transport roller pair 19c reaches the platen roller 27.

Further, the heat roller 20 is provided with a moving up-and-down mechanism (not shown) for bringing into press-contact and separating with/from the platen roller 27 disposed in the first transport path P1 via the transfer film F. The heat roller 20 is comprised of a heat roller, and transfers an image on the transfer film F to the card surface with the heating means disposed inside. In addition, the Se10 shown in the figure is a position detection sensor for the ink ribbon R, and the Se9 shown in the figure is a sensor for detecting the presence or absence of the transfer film F. In addition, the printing section PR is provided with a fan f2 to remove heat generated inside the device to the outside.

[Carrying-out Path]

On the downstream side of the printing section PR is provided a carrying-out path P5 for carrying out the card C to a storage stacker mount 60 of the card storage section 29. Transport rollers (which may be belts) 19d, 19e for transporting the card C are disposed in the carrying-out path P5 and are coupled to a transport motor, not shown. In addition, the decurl roller DR is disposed in between the transport roller 19d and the transport roller 19e, presses the card center portion held by the transport rollers 19d and 19e, and thereby corrects curl. Therefore, the decurl roller DR is configured to be able to move to positions in the vertical direction viewed in FIG. 7 by a moving up-and-down mechanism, not shown.

[Configuration of the Image Formation Section]

The image formation section PF forms an image such as a photograph of face and text data on the frontside and backside of the card C. The device shown in the figure shows the case of forming an image with a sublimation ink ribbon. In the image formation section PF are disposed the thermal head 9 and the ink ribbon R. The ink ribbon R is stored in the ribbon cassette 42, the ribbon cassette 42 stores the supply spool 7 as a ribbon supply section and the winding spool 8 as a ribbon winding section, and the winding spool 8 is coupled to a wind motor M5, not shown.

Then, the thermal head 9 is disposed in a position opposed to the platen roller 12. The thermal head 9 is coupled to a head control IC 74x (see FIG. 18) to control heat of the thermal head 9. The head control IC 74x controls heating of the thermal head 9 according to image data, and thereby forms the image on the transfer film F, described later, with the ink ribbon R. Therefore, the winding spool 8 is configured to rotate in synchronization with heat control of the thermal head 9, and wind up the ink ribbon R at a predetermined velocity. "f1" shown in the figure denotes a cooling fan to cool the thermal head 9.

The transfer film F is wound around the supply spool 5 as the supply section and the winding spool 6 as the winding section, and is provided so as to shift the transfer image to the platen roller 31 and transfer roller (heat roller) 20. "13" shown in FIGS. 7 and 13 is a shift roller as a main transport roller of the transfer film F, and the pinch rollers 20, 21 are disposed on the periphery of the roller, and the shift roller 13 is coupled to a driving motor, not shown. The transfer film F moves in a counterclockwise direction in FIG. 7 at the same velocity as the ink ribbon R.

[Storage Section]

Figure 7:
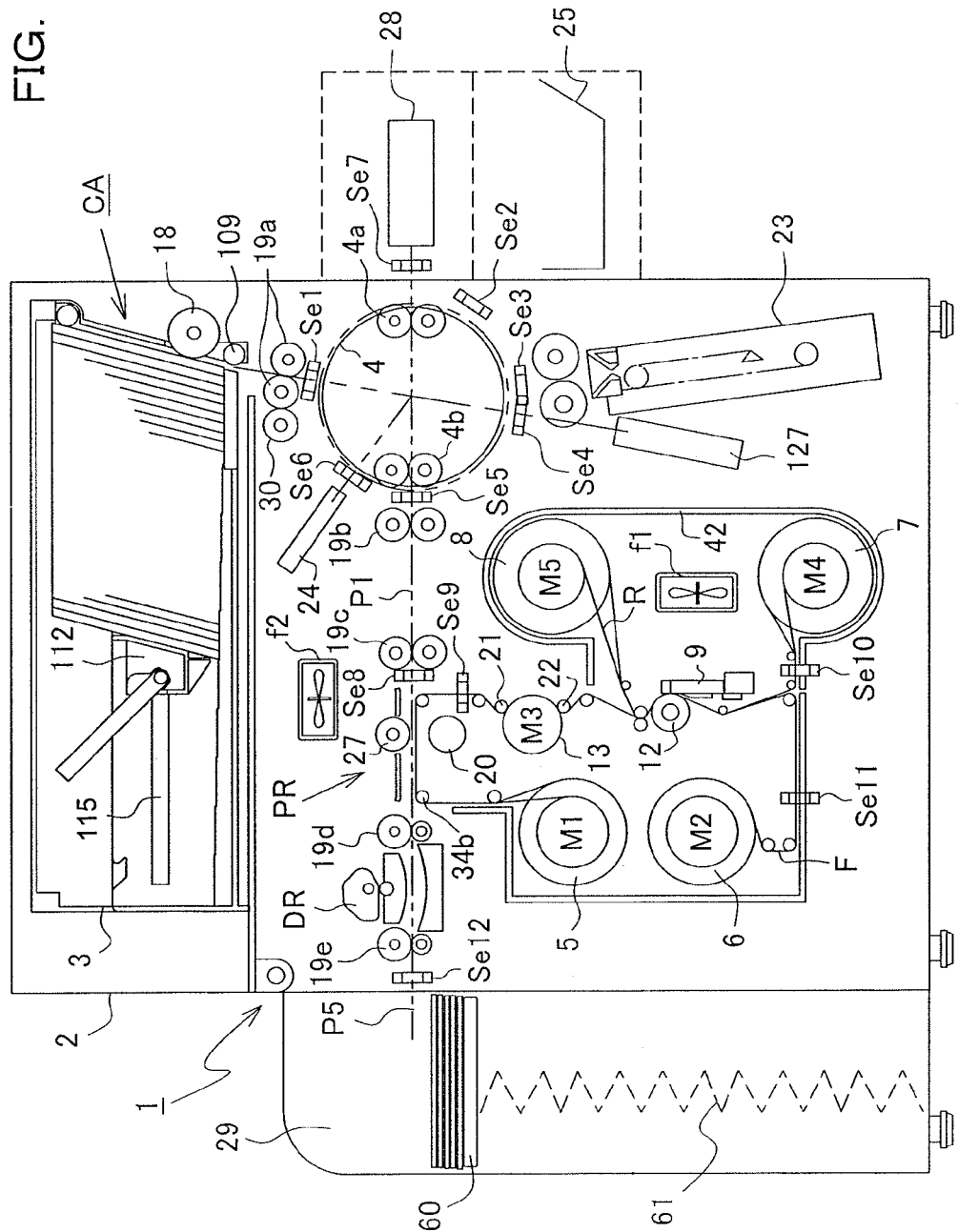
FIG. 7 is a front view showing the entire configuration of a printing device of Embodiment 2 to which the invention is applicable.
Figure 8:
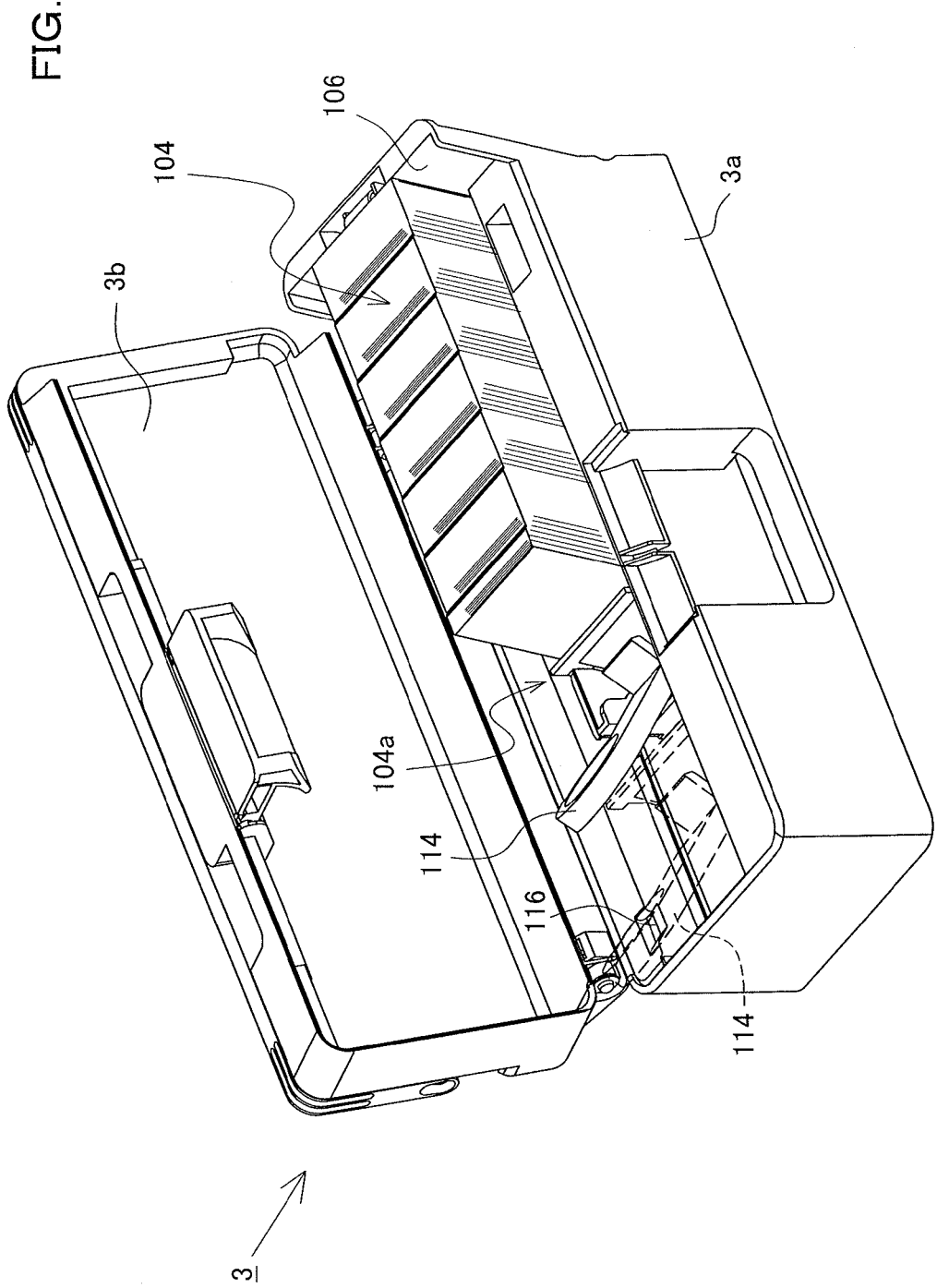
FIG. 8 is a perspective view showing the entire configuration of a card stacker in the device of FIG. 7.

As shown in FIG. 7, the storage section 29 is configured to store cards C fed from the printing section PR on the storage stacker mount 60. The storage stacker mount 60 is configured to move downward to the lower side as viewed in FIG. 7 with a moving up-and-down mechanism 61, by detecting the uppermost card with a level sensor and the moving up-and-down mechanism 61, not shown.

[Configuration of the Transfer Film Cassette]

Figure 14:
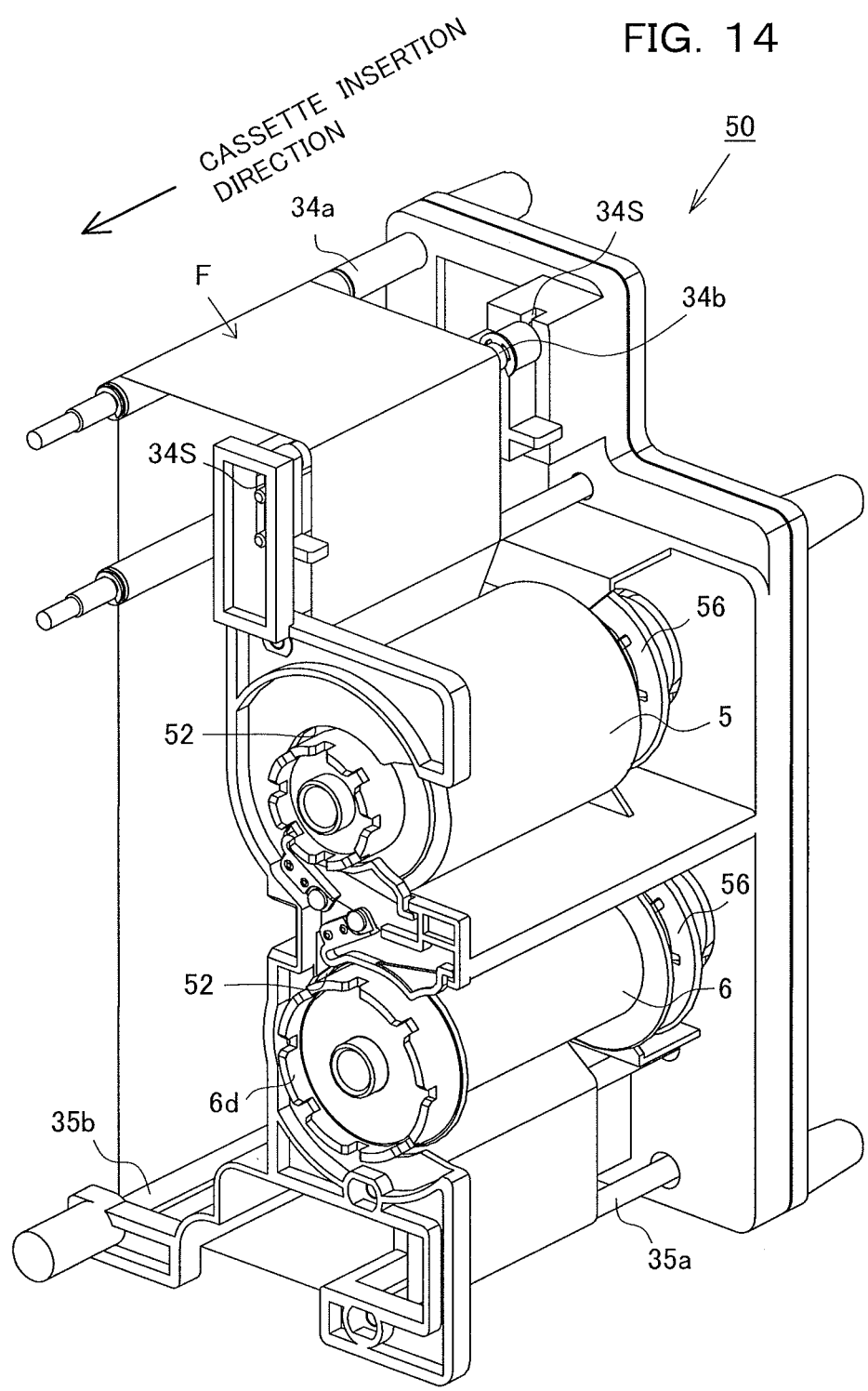
FIG. 14 is an entire perspective view of an intermediate transfer film cassette.

The transfer film cassette 50 installed with the transfer film F will be described. As shown in FIG. 14, the transfer film cassette 50 is comprised of a unit separate from the device housing 2, and is attached to the device housing 2 to be detachable and attachable. Although not shown in the figure, a front cover is disposed on the front side of FIG. 7 to be openable and closable, and with the front cover opened, the transfer film cassette 50 is inserted in the device frame in the arrow direction in FIG. 14.

The supply spool 5 and winding spool 6 are inserted in the transfer film cassette 50 to be detachable and attachable. "52"

shown in the figure denotes a bearing portion that supports one end of the spool, and "56" shown in the figure denotes a coupling member that supports the other end side of the spool. The bearing portions 52 and coupling members 56 disposed on the cassette side support the spool end portions. Then, the transfer film F is laid from the supply spool 5 to guide rollers 34a, 35b, 35a via a peeling roller 34b, and then to the winding spool 6.

In addition, the guide rollers 35a, 35b, 34a and peeling roller 34b shown in the figure are comprised of pin members (driven rollers) attached to the transfer film cassette 50, but the rollers may be fixed pins (that do not rotate). In the device, in transferring the image on the transfer film F to the card C, transfer is performed while winding the transfer film F by the supply spool 5. Accordingly, the peeling roller 34b is provided on the downstream side (on the side closer to the supply spool 5 than the heat roller 20) in the film transport direction of the time of transfer of transfer film F.

In thus laid transfer film F are engaged the shift roller 13 and pinch rollers 21, 22 disposed on the device side. Then, the driving rotation shaft (not shown) coupled to the supply spool 5 and winding spool 6 and the shift roller 13 are driven to rotate to move the film at the same velocity.

For the transfer film F stored in the transfer film cassette 50, a film travel path P4 is configured for the film to travel between the transfer platen roller 27 and the image formation section PF. The image formation section PF is disposed in the arrangement space of the standby section E of the first transport path P1 below the transport path. Then, the image formation section PF is comprised of the image platen 12 to form an image and the thermal head 9 disposed opposite the platen, and is disposed so that the ink ribbon R travels therebetween. A configuration of the ink ribbon will be described in the ribbon cassette.

[Configuration of the Ribbon Cassette]

The ribbon cassette 42 in the device of FIG. 7 will be described. As shown in FIG. 7, the supply spool 7 and winding spool 8 are incorporated into a plastic case 42a to be rotatable. The film-shaped ink ribbon R is wound between both spools 7, 8. For example, the ink ribbon R is a sublimation ribbon, and formed in the shape of a band in a panel sequence of ribbons Y (Yellow), M (Magenta), C (Cyan) and BK (Black). Then, the ink ribbon R is wound around the supply spool 7 in the shape of a roll.

The ribbon cassette 42 is inserted in the device housing 2 in the sheet frontside-backside direction in FIG. 7 to be detachable and attachable, and the ink ribbon R is inserted in between the image formation platen (platen roller) 45 and the thermal head 9 installed on the device housing 2 side. Further, the winding spool 8 engages in the wind motor M5 installed on the device housing 2 side with a coupling (not shown). In addition, a head moving up-and-down mechanism (not shown) is provided so that the thermal head 9 waits in the standby position separate from the platen roller 45 in inserting the ribbon cassette 42.

In the ribbon cassette 42, as shown in FIG. 7, spools 7, 8 are disposed in the path direction (vertical direction) of the second transport path P2. Meanwhile, also in the transfer film cassette 50 as described previously, the supply spool 5 and the winding spool 6 are disposed in the same direction (vertical direction). The spools 7, 8 of the ribbon cassette 42 and the spools 5, 6 of the transfer film cassette 50 are arranged in the substantially same direction, and it is thereby possible to configure the device densely.

[Operating State Explanation]

Figure 15A:
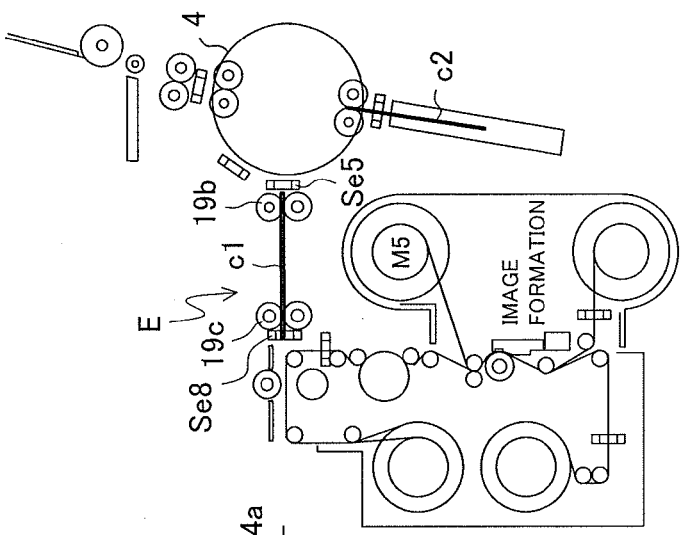
FIGS. 15(a) to 15(c) are operating state explanatory views of a card.

As described above, it is a feature of the invention that the card C to move from the card rotating section 4 to the printing section PR is caused to wait temporarily in the standby section E of the first transport path P1. The standby operation will be described according to FIG. 15. FIG. 15(a) shows a state in which the card C is fed from the card supply section CA to the second transport path P2. The control means 70 drives and rotates the card supply roller 18 by a medium feed instruction signal, and sends out the card C from the card stacker 3. The card C is fed to the card rotating section 4 by the carry-in roller 19a. The card rotating section 4 is set for an angular position to guide the card C to the second transport path P2.

Accordingly, the front card C is fed from the card stacker 3 to the second transport path P2. The magnetic recording unit (not shown) is incorporated into the second transport path P2, and records magnetic information, for example, on a magnetic stripe formed on the card C. In addition, in this case, the recording unit that records information in the second transport path P2 is not limited to the magnetic recording unit, and may be an IC recording unit or barcode writer. In addition, "127" of FIG. 7 denotes a contact type IC recording unit. Further, although not shown in the figure, the control means 70 changes the direction of the card rotating section 40 to record information in the third transport path P3 (in the device shown in the figure, non-contact IC information recording), after recording the information in the second transport path P2.

Figure 15B:
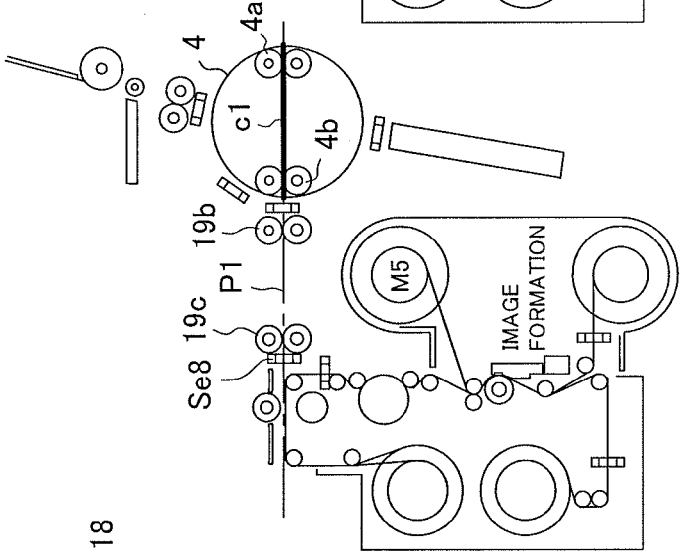

FIG. 15(b) shows a state in which the direction of the card C with the information recorded in the first transport path (and the third transport path) P1 (P3) is changed to the direction (first direction) of the first transport path P1. The first direction is disposed in the approximately horizontal direction in the device housing 2. Then, the control means 70 drives and rotates the roller pairs 4a, 4b of the card rotating section 4, and sends out the card C in the first direction from the card rotating section 4.

Figure 15C:
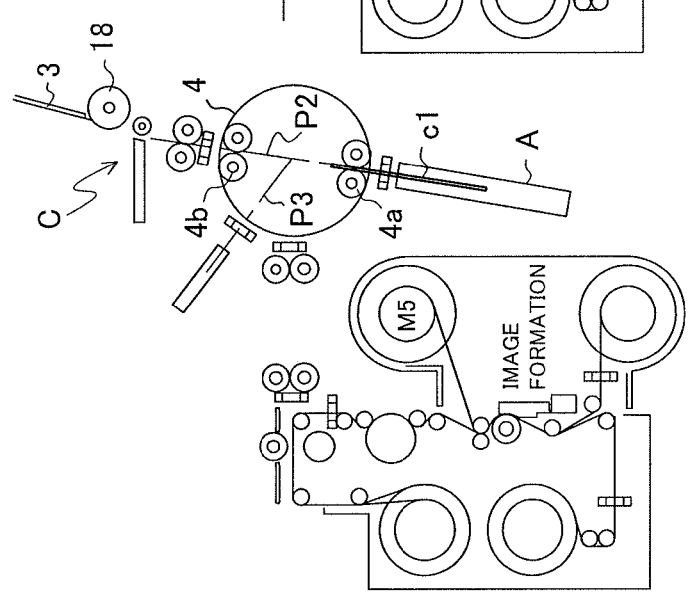

FIG. 15(c) shows a state in which the card C that is sent out of the card rotating section 4 waits in the standby section E. The transport roller pair 19b constituting the standby section E is disposed on the downstream side of the card rotating section 4, starts rotating with a signal such that the sensor Se5 detects the card front end, and stops rotating with (or immediately after) a signal of detecting the rear end. In this state, the card C finishing the information recording in the second transport path P2 is fed to the first transport path P1 promptly (irrespective of the processing status in the first transport path) after finishing the job, and waits in the standby section E positioned in the carry-in entrance of the path. At this point, the card rear end has reliably passed through the sensor Se5.

Accordingly, even when the card rotating section 4 is driven during standby of the card C, the section does not contact the card. In addition, in the state in which the card C is waiting, the card front end has passed through the sensor Se8. At this point, the control means 70 stores the number of pulses by which the card C is transported after the card front end passes through the Se8, and uses the number in feeding the card start position in image transfer, described later. In addition, in transporting the card C from the card rotating section 4 to the standby section E, the card C may be transported once to the downstream side from the printing section PR, switched back, and transported to the standby section E. By this means, it is possible to remove skew of the card C with a card skew removing mechanism, not shown. At this point, in the printing section PR, since the transfer film F is provided slightly below than the first transport path P1, the card C and the transfer film. F do not contact each other.

Meanwhile, the control means 70 forms an image on the transfer film F to prepare for image transfer in the first transport path P1. The image formation on the transfer film F is started after the job of information recording in the second transport path P2 or before the job. At processing timing (see FIG. 17) as described later, image formation is started by a medium feed instruction signal for sending out the card C from the card stacker 3. Accordingly, the maximum processing efficiency is obtained in starting image formation on the transfer film F concurrently with information recording on the card C. Meanwhile, when image formation on the transfer film F is started after the job of information recording in the second transport path P2, an unnecessary image is not formed on the transfer film F if an information recording error occurs.

Figure 16D:
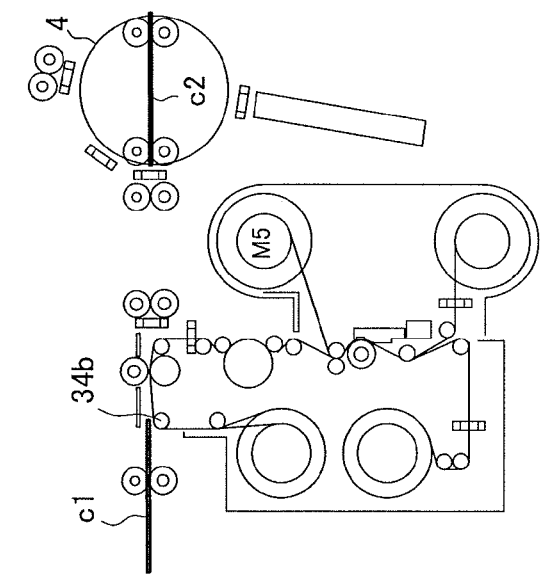
FIGS. 16(d) to 16(f) are operating state explanatory views of the card.

FIG. 16(d) shows a state immediately after finishing image formation on the transfer film F in the image formation section PF. At this point, the card C is sent out from the standby section E toward the printing section PR, and the image formation surface (image frame) of the transfer film F is fed to the printing section PR. At this point, the control means 70 sets the transport velocity of the card, the travel velocity of the transfer film and card sending-out timing so that timing at which the card front end reaches the printing section PR coincides with timing at which the front end of the image frame of the transfer film F reaches the printing section PR.

Figure 16E:
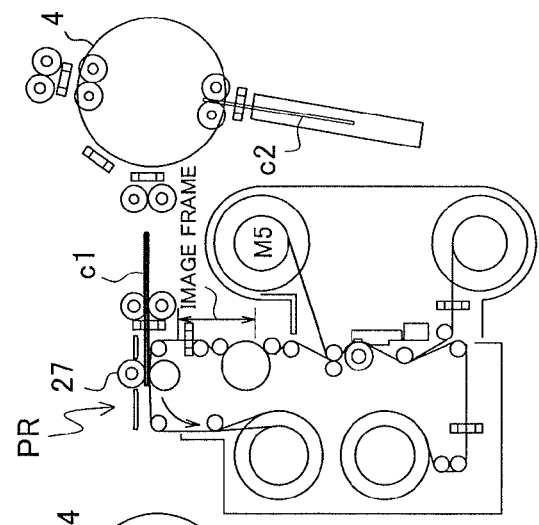

FIG. 16(e) shows the initial state in transferring the image to the card C in the printing section PR. At this point, the heat roller 20 moves from the standby position (position separate from the card C) to the operating position (position for contacting the card C), and heats the image on the transfer film to transfer onto the card C.

Figure 16F:
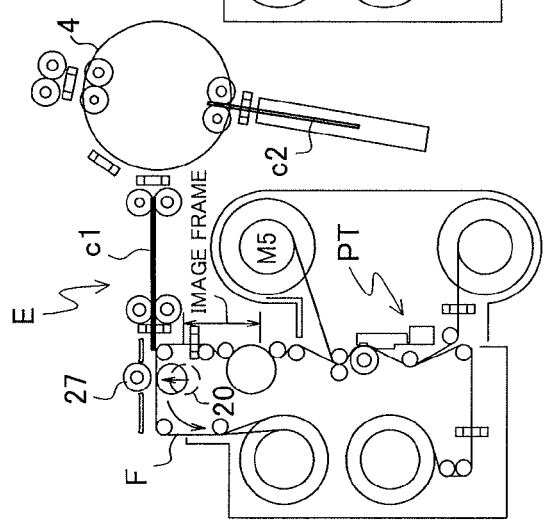

FIG. 16(f) shows a state in which the card rear end is carried out from the printing section PR. At this point, the peeling member (pin) 34b moves from the operating position to the standby position.

According to FIG. 17, described next is timing for performing simultaneous parallel processing on a plurality of cards C. FIG. 17(a) shows the case (gt>dt) where image formation time gt on the transfer film is longer than information recording time dt on the card C, and FIG. 17(b) shows the case of dt>gt.

When the control means 70 issues a medium feed instruction signal, a first card c1 is carried into the inside of the device from the card stacker 3, and information is recorded in the second transport path P2 (R/W). Concurrently therewith, upon receiving the medium feed instruction signal, the image formation section PF starts formation of an image on the transfer film F (c1 printing). When the information recording is finished in the second transport path P2, the card c1 is fed to the standby section E, and waits in the position (c1 standby). After this standby, when the image formation on the transfer film F is finished, the card c1 is sent out from the standby section E to the printing section PR (c1 feeding). Then, the image is transferred onto the card in the printing section PR (c1 transfer). The image-transferred card c1 is carried out to the storage stacker mount 60 (c1 discharge).

Next, after the first card c1 waits in the standby section E, upon receiving a medium feed instruction signal, a second card c2 is carried in from the card stacker 3 (c2 carry-in). The information is recorded on the card c2 in the second transport path P2 (R/W). Concurrently therewith, upon receiving the medium feed instruction signal, the image formation section PF starts formation of the image on the transfer film F (c2 printing). Next, as in the previous card, when the information recording is finished in the second transport path P2, the card c2 is fed to the standby section E, and waits in the position (c2 standby). In addition, at this point, the first card is carried out from the first transport path P1 to the outside. Thereafter, in the same manner, at timing as shown in FIG. 17(a), a third card is subjected to carry-in, R/W, printing, standby, feeding, transfer and carrying-out.

At processing timing (dt>gt) of FIG. 17(b), when the image formation time on the downstream side is shorter than the information recording time on the upstream side, without the card waiting in the standby position, each of a plurality of cards C is subjected to "carry-in, R/W, printing, transfer, carrying-out" processing at timing as shown in FIG. 17(b).

[Control Configuration]

Figure 18:
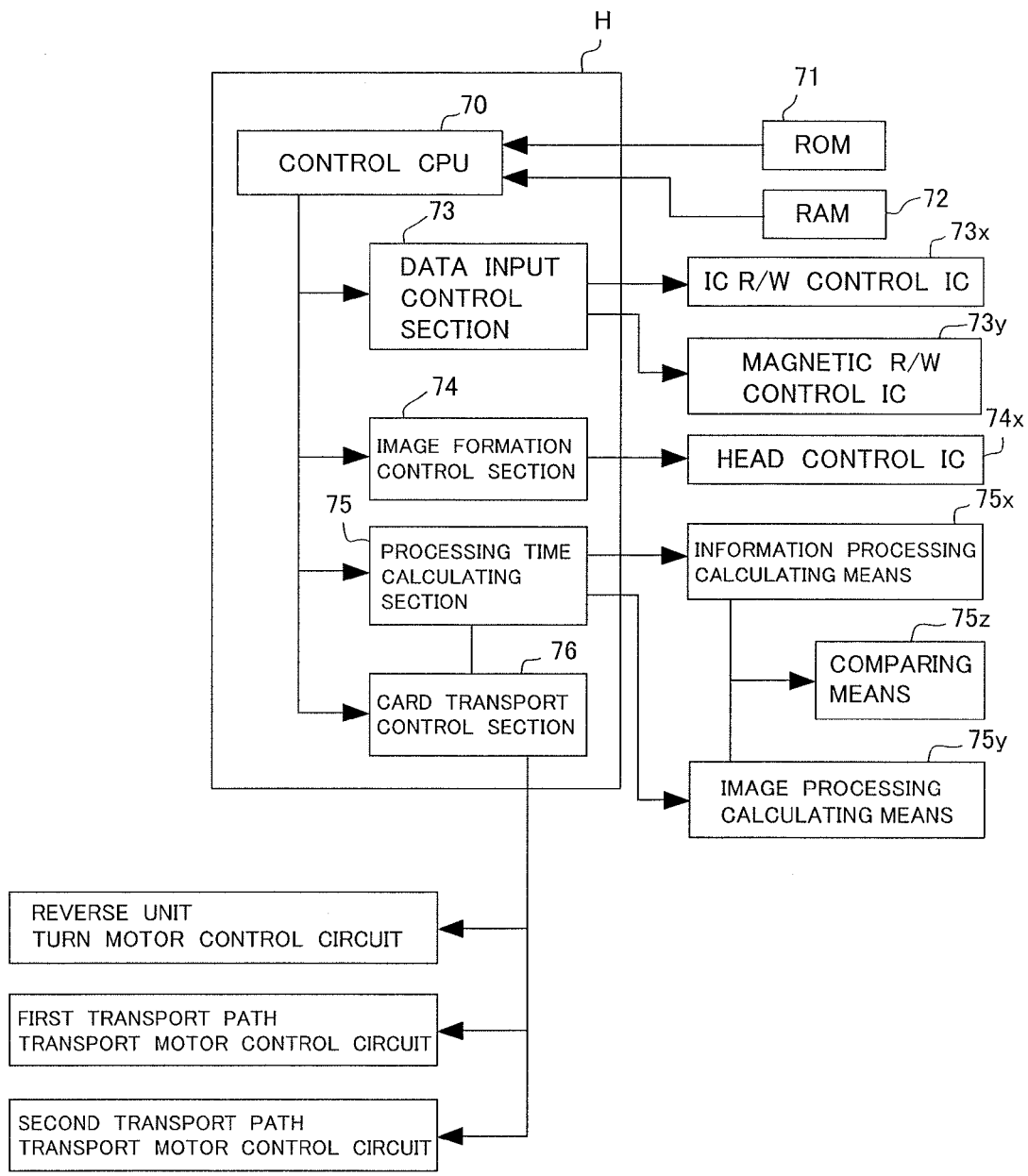
FIG. 18 is a control configuration diagram in the device of FIG. 7.

FIG. 18 describes the control configuration according to the invention. For example, a control section H is comprised of a control CPU 70, and the CPU 70 is provided with ROM 71 and RAM 72. Then, in the control CPU 70 are configured a data input control section 73, image formation control section 74, processing time calculating section 75, and card transport control section 76. Then, the card transport control section 76 transmits command signals to a driving circuit of a driving motor, not shown, to control the card transport means (the group of transport roller pairs 19b, 19c) disposed in the first transport path P1 and the carrying-out path P5. The card transport control section 76 transmits command signals to a driving circuit of the turn motor of the card rotating section 4.

The card transport control section 76 is electrically connected to sensors Se1 to Se12 to receive respective state signals. Concurrently therewith, the section 76 is connected to the data input control section 73 to receive job signals.

The data input control section 73 transmits command signals to control transmission and reception of input data to a data R/W IC 73x incorporated into the magnetic recording section A1. Similarly, the section 73 is configured to transmit command signals to a data R/W IC 73y of the IC recording section A2. The image formation control section 74 controls image formation on the frontside and backside of the card C in the image formation section PF.

Then, the RAM 72 stores the processing time to input data on the card in the data input section (magnetic/IC recording section), for example, in a data table.

Then, the card transport control section 76 is provided with a monitoring means and determining means, and each means is incorporated into the control program of the control CPU 70. The monitoring means is configured to receive a state signal of each sensor and a job signal of the data input control section 73 to monitor a transport state of the card C existing inside the device.

The processing time calculating section 75 is provided with an information processing calculating means 75x for calculating the finish time of information recording in the second transport path P2, image processing calculating means 75y for calculating the finish time of image formation in the image formation section PF, and comparing means 75z for comparing the processing time calculated in each calculating section. For example, using the medium feed instruction signal as a reference, the information processing calculating section 75x calculates from "time required to set the card in the second transport path" and "time required to record the information on the card". At this point, the time required to record the information is calculated from beforehand set scan time of the magnetic head.

Meanwhile, for example, the image processing calculating means 75y calculates from the length in the card moving direction of an image area to form the image on the card. In this case, the case of forming an image on the front in the card transport direction is of the maximum processing time.

Then, the control CPU 70 is configured to cause the information medium fed from the card rotating section 4 to wait in the standby section E when the finish time of image formation is later than the finish time of information recording in the comparing section 75z. Concurrently therewith, the control CPU 70 is configured to move the information medium fed from the card rotating section 4 to the printing section PR without causing the card to wait in the standby section E when the finish time of information recording is later than the finish time of image formation in the comparing section 75z.

INDUSTRIAL APPLICABILITY

The present invention is to provide a printing device capable of supporting large-amount discharge in response to large-amount supply of printing media while miniaturizing the device, therefore contributes to manufacturing and sales of the printing device, and has industrial applicability.

DESCRIPTION OF SYMBOLS

2 Device housing
2A Top cover (cover body)
3 Supply stacker (card stacker)
3a Stacker housing
4 Card rotating section
4a, 4b Roller pair
5 Supply spool
6 Winding spool
9 Thermal head
18 Supply roller
19b, 19c Transport roller
23 Second recording section (magnetic write section)
24 First recording section (IC write section)
25 Error discharge outlet (eject box)
28 Third recording section (barcode write section)
29 Discharge stacker (card storage section)
42 Ribbon cassette
45 Image formation platen (platen roller)
50 Transfer film cassette
104 Printing media storage section (card storage section)
105 Printing media placement surface (card placement surface)
105a Inclined surface
105b Step surfaces
106 Printing media lock surface (card lock surface)
107 Medium feed opening
108a, 108b Separation pad (separating means)
109 Idle roller (separating means)
112 Support member
115 Biasing member
CP Transport path
F Transfer film
H Control means
P1 First transport path
P2 Second transport path
PF Image formation section
PR Printing section
PT Image transfer section (Platen roller 27)
R Ink ribbon
SP Supply path

The invention claimed is:

1. A printing device capable of printing on a card-shaped printing medium, comprising:
a linear transport path to transport the printing medium;
a card rotating section provided at one end of the transport path to change a transport direction of the printing medium;
a supply stacker provided above the transport path and the card rotating section to store printing media prior to processing to be placed parallel in a laminate manner;
a printing section provided below the transport path to perform printing processing on the printing medium from below the transport path;
a discharge stacker provided at the other end of the transport path to store printing media subjected to the printing processing to overlap in a laminate manner; and
an openable/closable top cover to cover the transport path as a part of a device housing,
wherein the supply stacker is configured to be detachable and attachable with respect to the top cover, and the top cover is configured to be openable and closable only when the supply stacker is not attached to the top cover.

2. The printing device according to claim 1, wherein the printing section has an image formation section that forms an image on an intermediate transfer medium, and an image transfer section provided above the image formation section to transfer the image formed on the intermediate transfer medium to the printing medium, and a first recording section that records information on the printing medium is further provided in between the image transfer section and the card rotating section while being between the transport path and the supply stacker.

3. The printing device according to claim 2, wherein the first recording section performs recording processing on the printing medium, with the printing medium held at one end thereof by the card rotating section.

4. The printing device according to claim 2, further comprising:
a second recording section that records information on the printing medium, on the side opposite to the supply stacker in the card rotating section, on an extension of a supply path to supply the printing medium toward the card rotating section from the supply stacker.

5. The printing device according to claim 4, further comprising:
an error discharge outlet to discharge the printing medium when the recording processing fails in the first or second recoding section,
wherein the error discharge outlet is provided on the side opposite to the first recording section in the card rotating section, the first recording section, the card rotating section and the error discharge outlet are disposed linearly, and the printing medium failing in the recording processing is discharged toward the error discharge outlet from the card rotating section.

6. The printing device according to claim 4, further comprising:
a third recording section that records information on the printing medium on an extension of the transport path of the card rotating section,
wherein the third recording section performs recording processing on the printing medium with the printing medium held at one end thereof by the card rotating section.

7. The printing device according to claim 4, wherein the printing section is provided in between the discharge stacker and the second recording section.

8. The printing device according to claim 1, wherein on a sending side of the supply stacker are provided a supply roller that sends out the printing medium, and a separating part configured to separate the sent printing medium on a sheet-by-sheet basis,
the supply stacker comprises a stacker housing, a printing media storage section that aligns and stores a plurality of printing media in a standing posture forward and backward in a sending direction, a medium feed opening to feed a front printing medium stored in the printing media storage section toward the printing section, a support member that supports a back of a backmost printing medium stored in the printing media storage section, and a biasing unit configured to bias the support member in the sending direction of the printing medium, each provided inside the stacker housing, the printing media storage section is provided with a printing media placement surface to place the printing media in the standing posture, and a printing media lock surface that engages in the front printing medium, and the printing media lock surface has an inclined surface that locks the printing media in a forward-tilting posture.

9. The printing device according to claim 8, wherein the housing of the supply stacker is provided with a sending-out opening that engages the supply roller in a surface of the front printing medium in the printing media storage section, and the printing media lock surface, the sending-out opening and the medium feed opening are disposed in this order in a printing media feeding direction.

10. The printing device according to claim 8, wherein the device housing is provided with a stacker insertion opening to insert the supply stacker, and the stacker insertion opening is configured to enable the supply stacker to be inserted and removed in the approximately same direction as a printing medium carrying-out direction.

11. The printing device according to claim 8, wherein the printing media placement surface has a height difference that inclines the printing medium forward in the sending direction.

12. The printing device according to claim 8, wherein the printing media placement surface comprises a plurality of step surfaces that are lowered stepwise in the sending direction.

13. The printing device according to claim 8, wherein the printing media placement surface comprises an inclined surface that is lowered gradually in the sending direction.

14. The printing device according to claim 8, wherein the separating part comprises a separation gap provided in the supply stacker to separate printing media.

15. The printing device according to claim 1, wherein the supply stacker is configured to be detachable and attachable with respect to the top cover so that the printing medium is transported from a top part of the card rotating section.

16. A printing device capable of printing on a card-shaped printing medium, comprising:

a linear transport path to transport the printing medium;

a card rotating section provided at one end of the transport path to change a transport direction of the printing medium;

a supply stacker provided above the transport path and the card rotating section to store printing media prior to processing to be placed parallel in a laminate manner;

a printing section provided below the transport path to perform printing processing on the printing medium from below the transport path;

a discharge stacker provided at the other end of the transport path to store printing media subjected to the printing processing to overlap in a laminate manner; and a second recording section that records information on the printing medium, on the side opposite to the supply stacker in the card rotating section, on an extension of a supply path to supply the printing medium toward the card rotating section from the supply stacker, wherein the printing section has an image formation section that forms an image on an intermediate transfer medium, and an image transfer section provided above the image formation section to transfer the image formed on the intermediate transfer medium to the printing medium, and a first recording section that records information on the printing medium is further provided in between the image transfer section and the card rotating section while being between the transport path and the supply stacker.

17. The printing device according to claim 16, further comprising:

an error discharge outlet to discharge the printing medium when the recording processing fails in the first or second recoding section, wherein the error discharge outlet is provided on the side opposite to the first recording section in the card rotating section, the first recording section, the card rotating section and the error discharge outlet are disposed linearly, and the printing medium failing in the recording processing is discharged toward the error discharge outlet from the card rotating section.

18. The printing device according to claim 16, further comprising:

a third recording section that records information on the printing medium on an extension of the transport path of the card rotating section, wherein the third recording section performs recording processing on the printing medium with the printing medium held at one end thereof by the card rotating section.

19. The printing device according to claim 16, wherein the printing section is provided in between the discharge stacker and the second recording section.

* * * * *